US008908291B1

(12) United States Patent
Chung et al.

(10) Patent No.: US 8,908,291 B1
(45) Date of Patent: Dec. 9, 2014

(54) OPTICAL LENS SYSTEM

(71) Applicant: Glory Science Co., Ltd., Changhua Hsien (TW)

(72) Inventors: Feng-Chao Chung, Changhua Hsien (TW); Shih-Yuan Chang, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 0 days.

(21) Appl. No.: 14/135,159

(22) Filed: Dec. 19, 2013

(51) Int. Cl.
*G02B 3/02* (2006.01)
*G02B 13/18* (2006.01)

(52) U.S. Cl.
CPC .................................. *G02B 13/18* (2013.01)
USPC ....................................................... 359/715

(58) Field of Classification Search
USPC .......................................................... 359/715
See application file for complete search history.

(56) References Cited

U.S. PATENT DOCUMENTS

| | | | |
|---|---|---|---|
| 7,715,119 B2 | 5/2010 | Taniyama | |
| 7,755,853 B2 | 7/2010 | Taniyama | |
| 8,199,418 B2 | 6/2012 | Chen et al. | |
| 8,358,475 B2 | 1/2013 | Tsai et al. | |
| 8,395,691 B2 | 3/2013 | Tang et al. | |
| 8,405,919 B2 | 3/2013 | Tsai et al. | |
| 8,432,622 B2 | 4/2013 | Huang et al. | |
| 8,441,745 B2 | 5/2013 | Tang et al. | |
| 2012/0287514 A1* | 11/2012 | Tang et al. | 359/715 |

* cited by examiner

*Primary Examiner* — James Jones
(74) *Attorney, Agent, or Firm* — Banger Shia

(57) ABSTRACT

An optical lens system, sequentially arranged from an object side to an image side along an optical axis, includes: a stop, a first lens element with positive refractive power having a convex object-side surface, a second lens element with negative refractive power, a third lens element with positive refractive power having a concave object-side surface and a convex image-side surface, and a fourth lens element with negative refractive power having a concave image-side surface with both being aspheric. Furthermore, the optical lens system satisfies conditions related to increase the field of view and reduce the total length as well as the sensitivity of assembly tolerance of the optical lens system.

20 Claims, 18 Drawing Sheets

OPTICAL LENS SYSTEM

BACKGROUND OF THE INVENTION

1. Field of the Invention

The present invention relates to an optical lens system, and more particularly to a four-piece optical lens system applicable to electronic products.

2. Description of the Prior Art

With the consumer electronic industry continuously growing, the current market demand for small imaging lens system is also increasing. Especially for the imaging lens application in mobile phone, tablet computer and notebook, optical lens system has almost become mainstream in the market. Nowadays, as all types of electronic products are becoming thinner, lighter and easier to carry, the imaging lens system also needs to be further reduced in size in order to fit in the increasingly miniaturized carrier. Fine pixel and good image quality have become basic requirements for optical lens system. In addition, consumers also demand that more persons or views can be recorded on a photograph, therefore, it is becoming increasingly important whether an optical lens system has a wide-angle of view or not.

In order to miniaturize the lens system and widen the angle of view, the lens elements of the lens system must have a very short combined focal length so as to form an image within a short distance. As the refractive power of the lens elements increases, the aberration correction will become difficult, and the aberration has to be corrected by arranging more lens elements or using aspheric lens elements. Furthermore, the thickness of the lens elements and the air spaces also need to be minimized, which imposes high requirements on the tolerance during manufacturing and assembling process, making the lens system difficult to manufacture.

Conventional arts, such as U.S. Pat. Nos. 7,715,119 and 7,755,853, use glass as the material of the first lens element to provide better aberration, reduce the size of the lens system while improving image quality. However, the manufacturing cost of the glass lens element is high.

The lens systems disclosed in U.S. Pat. Nos. 8,405,919, 8,395,691, 8,358,475 and 8,199,418, without using glass lens elements, are capable of providing better image quality simply by adjusting the refractive powers and positions of the lens elements. However, the FOV (field of view) of all these lens systems is less than 76 degrees, and the proportion of the total length to the half of the maximum image height of the lens system (TL/ImgH) is greater than 1.6. Since the image angle is small and the total length is relatively long, all these four lens systems cannot satisfy with the demand for wide-angle shooting and miniaturization.

The lens systems disclosed in U.S. Pat. Nos. 8,441,745 and 8,432,622 are capable of wide-angle shooting by using a first lens element with a negative refractive power. However, the total length of these two lens systems is too long to fit in the miniaturized electronic products, such as mobile phone, notebook or tablet computer.

The present invention has been made in order to solve the above-mentioned problems.

SUMMARY OF THE INVENTION

The primary objective of the present invention is to provide an optical lens system applicable to all kinds of electronic products, such as mobile phone, computer, etc, that require the use of micro camera. The optical lens system of the present invention has a wide angle of view, extra short length, high image quality and low sensitivity to assembly tolerance.

According to one aspect of the present invention, an optical lens system comprises, in order from an object side to an image side:

a stop;

a first lens element with a positive refractive power made of plastic having a convex object-side surface;

a second lens element with a negative refractive power made of plastic having an aspheric object-side surface and an aspheric image-side surface;

a third lens element with a positive refractive power made of plastic having a concave object-side surface and a convex image-side surface;

a fourth lens element with a refractive power made of plastic having an aspheric object-side surface and an aspheric concave image-side surface, and at least one inflection point being formed on at least one of the object-side surface and the image-side surface of the fourth lens element;

a focal length of the first lens element is f1, a focal length of the optical lens system is f, a maximum effective diameter of the image-side surface of the third lens element is CA_L3S2, a maximum effective diameter of the image-side surface of the fourth lens element is CA_L4S2; and they satisfy the conditions:

$1<f1/f<1.6$;

$0.4<CA\_L3S2/CA\_L4S2<0.7$.

When the condition $1<f1/f<1.6$ is satisfied, the distribution of the refractive power of the first lens can be controlled, so that the optical lens system can maintain a wider angle of view, and the sensitivity of the optical lens system assembly can be reduced.

When the condition $0.4<CA\_L3S2/CA\_L4S2<0.7$ is satisfied, the total length of the optical lens system would be effectively reduced; Moreover, the occurrence of ghost caused by secondary reflection from the fourth lens element can also be effectively prevented.

Preferably, a distance between the object-side surface of the second lens element and the object-side surface of the third lens element along an optical axis is Dr4r6, a distance from the object-side surface of the first lens element to an image plane along the optical axis is TL, and they satisfy the condition:

$Dr4r6/TL<0.2$.

When the above condition is satisfied, the total length of the optical lens system can be further reduced.

Preferably, a radius of curvature of the object-side surface of the second lens element is R4, a radius of curvature of the image-side surface of the second lens element is R5, and they satisfy the condition:

$-4<(R4-R5)/(R4+R5)<4$.

When the above condition is satisfied, the spherical aberrations of the optical lens system can be better balanced, and the sensitivity of assembly tolerance of the optical lens system can also be reduced.

Preferably, a focal length of the third lens element is f3, the focal length of the optical lens system is f, and they satisfy the condition:

$0.3<f3/f<5.5$.

When the above condition is satisfied, the sensitivity of assembly tolerance of the optical lens system can be reduced, and the back focal length can also be maintained at an appropriate space for placing other components, such as Infrared filter plate and sensor protection glass, as well as for preventing the image degradation caused by dust particles.

Preferably, an Abbe number of the third lens element is Vd3, an Abbe number of the second lens element is Vd2, and they satisfy the condition:

$Vd3-Vd2>25$.

When the above condition is satisfied, the chromatic aberrations of the optical lens system can be well corrected.

Preferably, a distance between the image-side surface of the third lens element and the object-side surface of the fourth lens element along an optical axis is Dr7r8, a distance from the object-side surface of the first lens element to an image plane along the optical axis is TL, and they satisfy the condition:

2.0<Dr7r8×100/TL<13.

When the above condition is satisfied, the total length of the optical lens system can be further reduced.

Preferably, a distance from the object-side surface of the second lens element to the image-side surface of the third lens element along an optical axis is Dr4r7, the focal length of the optical lens system is f, and they satisfy the condition:

Dr4r7/f<0.6.

When the above condition is satisfied, the total length of the optical lens system can be further reduced, and the angle of field of view will be increased too.

Preferably, a distance from the object-side surface of the first lens element to an image plane along an optical axis is TL, and a half of the maximum image height of the optical lens system is ImgH, and they satisfy the condition:

TL/ImgH<1.6.

When the above condition is satisfied, the compact size of the optical lens system can be maintained for its usage in miniaturized electronic products TL and ImgH can further satisfy the condition:

TL/ImgH<1.55.

Preferably, a maximum field of view of the optical lens system is FOV which satisfies the condition:

FOV>80.

Therefore, the larger field of view can be provided for wide-range imaging without image distortion.

According to another aspect of the present invention, an optical lens system comprises, in order from an object side to an image side:

a stop;

a first lens element with a positive refractive power made of plastic having a convex object-side surface;

a second lens element with a negative refractive power made of plastic having an aspheric object-side surface and an aspheric concave image-side surface;

a third lens element with a positive refractive power made of plastic having a concave object-side surface and a convex image-side surface;

a fourth lens element with a negative refractive power made of plastic having an aspheric object-side surface and an aspheric concave image-side surface, and at least one inflection point being formed on at least one of the object-side surface and the image-side surface of the fourth lens element;

a focal length of the first lens element is f1, a focal length of the optical lens system is f, a distance between the image-side surface of the third lens element and the object-side surface of the fourth lens element along an optical axis is Dr7r8, a distance from the object-side surface of the first lens element to an image plane along the optical axis is TL, and they satisfy the conditions:

1<f1/f<1.6;
2.0<Dr7r8×100/TL<13.

When the condition 1<f1/f<1.6 is satisfied, the distribution of the refractive power of the first lens can be controlled, so that the optical lens system can maintain a wider angle of view, and the sensitivity of assembly tolerance of the optical lens system can be reduced.

When the condition 2.0<Dr7r8×100/TL<13 is satisfied, the total length of the optical lens system can be effectively reduced.

Preferably, a distance between the object-side surface of the second lens element and the object-side surface of the third lens element along an optical axis is Dr4r6, a distance from the object-side surface of the first lens element to an image plane along the optical axis is TL, and they satisfy the condition:

Dr4r6/TL<0.2.

When the above condition is satisfied, the total length of the optical lens system can be further reduced.

Preferably, a radius of curvature of the object-side surface of the second lens element is R4, a radius of curvature of the image-side surface of the second lens element is R5, and they satisfy the condition:

−4<(R4−R5)/(R4+R5)<4.

When the above condition is satisfied, the spherical aberrations of the optical lens system can be better balanced, and the assembly tolerance can also be reduced.

Preferably, a focal length of the third lens element is f3, the focal length of the optical lens system is f, and they satisfy the condition:

0.3<f3/f<5.5.

When the above condition is satisfied, the assembly tolerance can be reduced, and the back focal length can also be maintained at an appropriate space for placing other components, such as Infrared filter plate and sensor protection glass, as well as for preventing the image degradation caused by dust particles.

Preferably, an Abbe number of the third lens element is Vd3, an Abbe number of the second lens element is Vd2, and they satisfy the condition:

Vd3−Vd2>25.

When the above condition is satisfied, the chromatic aberrations of the optical lens system can be well corrected.

A maximum effective diameter of the image-side surface of the third lens element is CA_L3S2, a maximum effective diameter of the image-side surface of the fourth lens element is CA_L4S2; and they satisfy the condition:

0.4<CA—L3S2/CA—L4S2<0.7.

When the condition 0.4<CA_L3S2/CA_L4S2<0.7 is satisfied, the total length of the optical lens system would be further reduced; Moreover, the occurrence of ghost caused by secondary reflection from the fourth lens element can also be effectively prevented.

Preferably, a distance from the object-side surface of the second lens element to the image-side surface of the third lens element along an optical axis is Dr4r7, the focal length of the optical lens system is f, and they satisfy the condition:

Dr4r7/f<0.6.

When the above condition is satisfied, the total length of the optical lens system can be further reduced, and the angle of field of view will be increased too.

Preferably, a distance from the object-side surface of the first lens element to an image plane along an optical axis is TL, and a half of the maximum image height of the optical lens system is ImgH, and they satisfy the condition:

TL/ImgH<1.6.

When the above condition is satisfied, the compact size of the optical lens system can be maintained for its usage in miniaturized electronic products TL and ImgH can further satisfy the condition:

TL/ImgH<1.55.

Preferably, a maximum field of view of the optical lens system is FOV which satisfies the condition:

FOV>80.

Therefore, the larger field of view can be provided for wide-range imaging without image distortion.

DETAILED DESCRIPTION OF THE PREFERRED EMBODIMENTS

It is to be noted that in the following embodiments of the present four-piece optical lens system, the terms "convex object-side surface", "convex image-side surface", "concave object-side surface" and "concave image-side surface" refer to the surfaces of the lens elements near the optical axis.

Figure 1A:
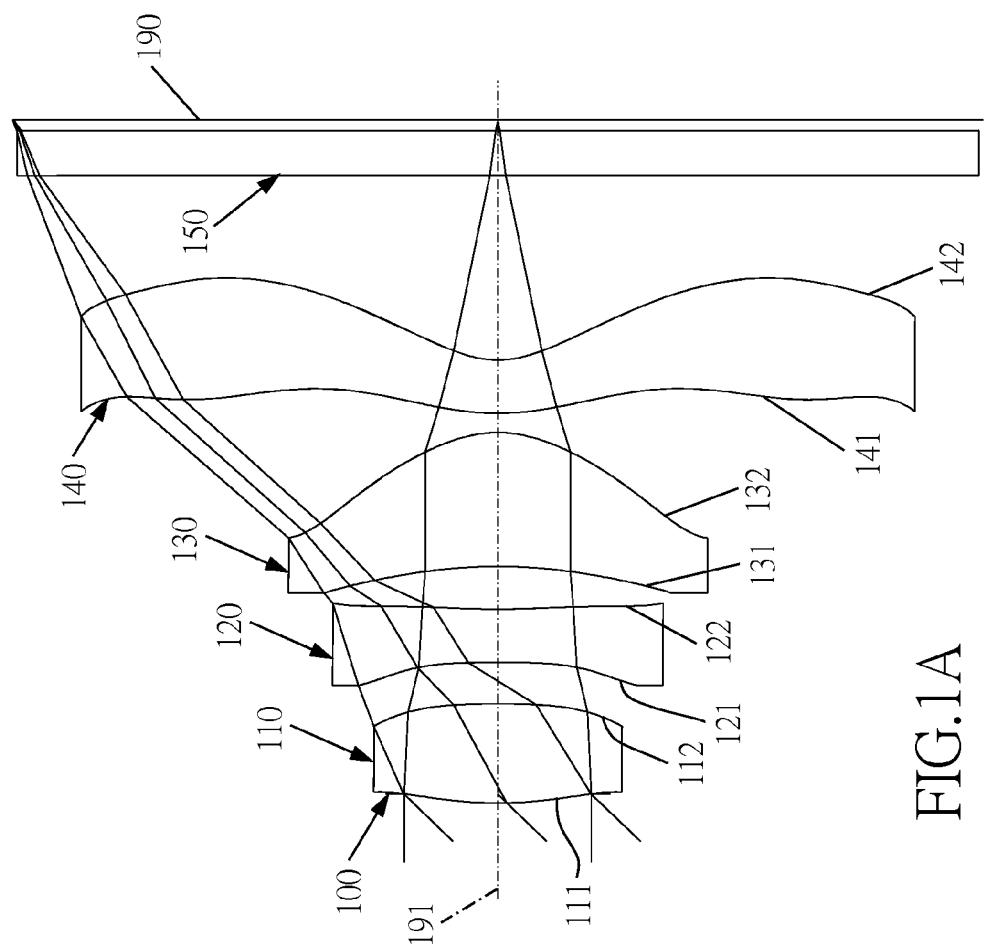
FIG. 1A shows an optical lens system cross-sectional view in accordance with the first embodiment.
Figure 1B:
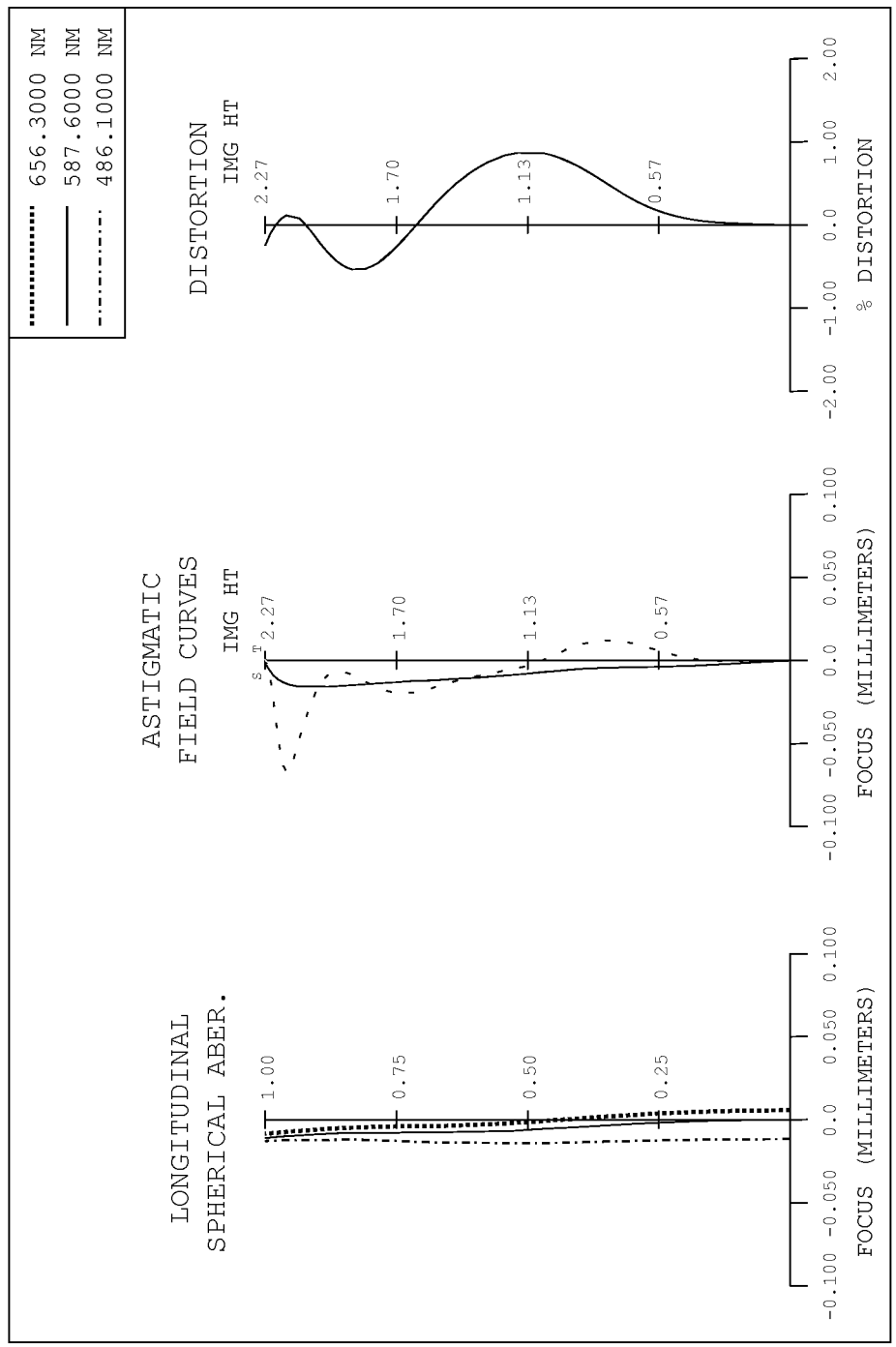
FIG. 1B shows spherical aberration curve, astigmatic field curves and distortion curve of the optical lens system in accordance with the first embodiment.

Referring to FIG. 1A, which shows an optical lens system cross-sectional view in accordance with a first embodiment of the present invention, and FIG. 1B shows the spherical aberration curves, the astigmatic field curves, and the distortion curve of the first embodiment of the present invention. An optical lens system in accordance with the first embodiment of the present invention comprises, in order from the object side to the image side:

A stop 100.

A first lens element 110 with a positive refractive power made of plastic has a convex object-side surface 111 and a convex image-side surface 112, and the object-side surface 111 and the image-side surface 112 of the first lens element 110 are aspheric.

A second lens element 120 with a negative refractive power made of plastic has a concave object-side surface 121 and a concave image-side surface 122, and the object-side surface 121 and the image-side surface 122 of the second lens element 120 are aspheric.

A third lens element 130 with a positive refractive power made of plastic has a concave object-side surface 131 and a convex image-side surface 132, and the object-side surface 131 and the image-side surface 132 of the third lens element 130 are aspheric.

A fourth lens element 140 with a negative refractive power made of plastic has a convex object-side surface 141 and a concave image-side surface 142, the object-side surface 141 and the image-side surface 142 of the fourth lens element 140 are aspheric, and at least one inflection point is formed on each of the object-side surface 141 and the image-side surface 142 of the fourth lens element 140.

An IR filter 150 made of glass is located between the image-side surface 142 of the fourth lens element 140 and an image plane 190 and has no influence on the focal length of the optical lens system.

The equation for the aspheric surface profiles of the first embodiment is expressed as follows:

$$z(h) = \frac{ch^2}{1 + \sqrt{1 - (1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4$, $A_6$, $A_8$, $A_{10}$, $A_{12}$, $A_{14}$ . . . : represent the high-order aspheric coefficients.

In the first embodiment of the present optical lens system, the focal length of the optical lens system is f, and it satisfies the condition:

f=2.18.

In the first embodiment of the present optical lens system, the f-number of the optical lens system is Fno, and it satisfies the condition:

Fno=2.5.

In the first embodiment of the present optical lens system, half of the maximum field of view of the present optical lens system is HFOV, it satisfies the relation: HFOV=46.1; and the maximum field of view of the present optical lens system is FOV, it satisfies the condition: FOV=92.2.

In the first embodiment of the present optical lens system, the focal length of the first lens element 110 is f1, the focal length of the optical lens system is f, and they satisfy the condition:

f1/f=1.14.

In the first embodiment of the present optical lens system, the maximum effective diameter of the image-side surface 132 of the third lens element 130 is CA_L3S2, the maximum effective diameter of the image-side surface 142 of the fourth lens element 140 is CA_L4S2, and they satisfy the condition: CA_L3S2/CA_L4S2=0.55.

In the first embodiment of the present optical lens system, a distance between the image-side surface 132 of the third lens element 130 and the object-side surface 141 of the fourth lens element 140 along the optical axis 191 is Dr7r8, a distance from the object-side surface 111 of the first lens element 110 to the image plane 190 along the optical axis 191 is TL, and they satisfy the condition: Dr7r8×100/TL=2.80.

In the first embodiment of the present optical lens system, a distance between the object-side surface 121 of the second lens element 120 and the object-side surface 131 of the third lens element 130 along the optical axis 191 is Dr4r6, a distance from the object-side surface 111 of the first lens element 110 to the image plane 190 along the optical axis 191 is TL, and they satisfy the condition: Dr4r6/TL=0.14.

In the first embodiment of the present optical lens system, a radius of curvature of the object-side surface 121 of the second lens element 120 is R4, a radius of curvature of the image-side surface 122 of the second lens element 120 is R5, and they satisfy the condition: (R4−R5)/(R4+R5)=1.92.

In the first embodiment of the present optical lens system, the focal length of the third lens element 130 is f3, the focal length of the optical lens system is f, and they satisfy the condition: f3/f=0.53.

In the first embodiment of the present optical lens system, an Abbe number of the third lens element 130 is Vd3, an Abbe number of the second lens element 120 is Vd2, and they satisfy the condition: Vd3−Vd2=34.00.

In the first embodiment of the present optical lens system, a distance from the object-side surface 121 of the second lens element 120 to the image-side surface 132 of the third lens element 130 along the optical axis 191 is Dr4r7, the focal length of the optical lens system is f, and they satisfy the condition: Dr4r7/f=0.49. In the first embodiment of the present optical lens system, the distance from the object-side surface 111 of the first lens element 110 to the image plane 190 along the optical axis 191 is TL, and a half of the maximum image height of the present optical lens system is ImgH, and they satisfy the condition: TL/ImgH=1.41.

The detailed optical data of the first embodiment is shown in table 1, and the aspheric surface data is shown in table 2, wherein the units of the radius of curvature, the thickness and the focal length in table 1 are expressed in mm, and in table 2, k represents the conic constant, and $A_4$, $A_6$, $A_8$, $A_{10}$, $A_{12}$, $A_{14}$ . . . : represent the high-order aspheric coefficients. In the tables 1 and 2, the surfaces 2 and 3 represent the object-side surface 111 and the image-side surface 112 of the first lens element 110, respectively, the surfaces 4 and 5 represent the object-side surface 121 and the image-side surface 122 of the second lens element 120, respectively, the surfaces 6 and 7 represent the object-side surface 131 and the image-side surface 132 of the third lens element 130, respectively, and the surfaces 8 and 9 represent the object-side surface 141 and the image-side surface 142 of the fourth lens element 140, respectively.

TABLE 1

(Embodiment 1)
f (focal length) = 2.18 mm, Fno = 2.5, HFOV

| Surface # | | Curvature Radius | Thickness | Material | index | Abbe | Focal length |
|---|---|---|---|---|---|---|---|
| 0 | Object | Infinity | Infinity | | | | |
| 1 | Stop | Infinity | −0.04 | | | | |
| 2 | Lens 1 | 1.90 (ASP) | 0.46 | Plastic | 1.544 | 56 | 2.49 |
| 3 | | −4.30 (ASP) | 0.19 | | | | |
| 4 | Lens 2 | −11.22 (ASP) | 0.25 | Plastic | 1.642 | 22 | −4.16 |
| 5 | | 3.54 (ASP) | 0.20 | | | | |
| 6 | Lens 3 | −2.25 (ASP) | 0.63 | Plastic | 1.544 | 56 | 1.17 |
| 7 | | −0.54 (ASP) | 0.09 | | | | |
| 8 | Lens 4 | 1.16 (ASP) | 0.25 | Plastic | 1.533 | 57 | −1.44 |
| 9 | | 0.43 (ASP) | 0.41 | | | | |
| 10 | IR-filter | Infinity | 0.21 | Glass | 1.517 | 64 | — |
| 11 | | Infinity | 0.50 | | | | |
| 12 | Image | Infinity | — | | | | |

TABLE 2

Aspheric Coefficients

| Surface # | 2 | 3 | 4 | 5 |
|---|---|---|---|---|
| k = | −2.94597 | 4.110236 | 5.082019 | −100 |
| A4 = | −0.1068 | −0.6184 | −1.0323 | −0.2496 |
| A6 = | −0.1494 | 0.4176 | 1.5509 | −0.0076 |
| A8 = | −3.0268 | −3.0754 | −7.0421 | 1.5572 |
| A10 = | 14.7127 | 8.1936 | 29.8128 | −3.3844 |
| A12 = | −43.0601 | −4.7856 | −42.2724 | 3.9049 |
| A14 = | 43.9908 | −3.7065 | 17.8407 | −1.7616 |

| Surface # | 6 | 7 | 8 | 9 |
|---|---|---|---|---|
| k = | −16.1138 | −3.7832 | −4.2724 | −3.5841 |
| A4 = | −0.0261 | −0.4374 | −0.3363 | −0.1928 |
| A6 = | −0.1958 | 0.5472 | 0.1914 | 0.0996 |
| A8 | 0.6038 | −0.6652 | −0.0635 | −0.0319 |
| A10 = | −0.3827 | 0.6877 | 0.0189 | 0.0026 |
| A12 = | −0.6002 | −0.0851 | −0.0040 | 0.0012 |
| A14= | 0.5948 | −0.1081 | 0.0003 | −0.0002 |

Figure 2A:
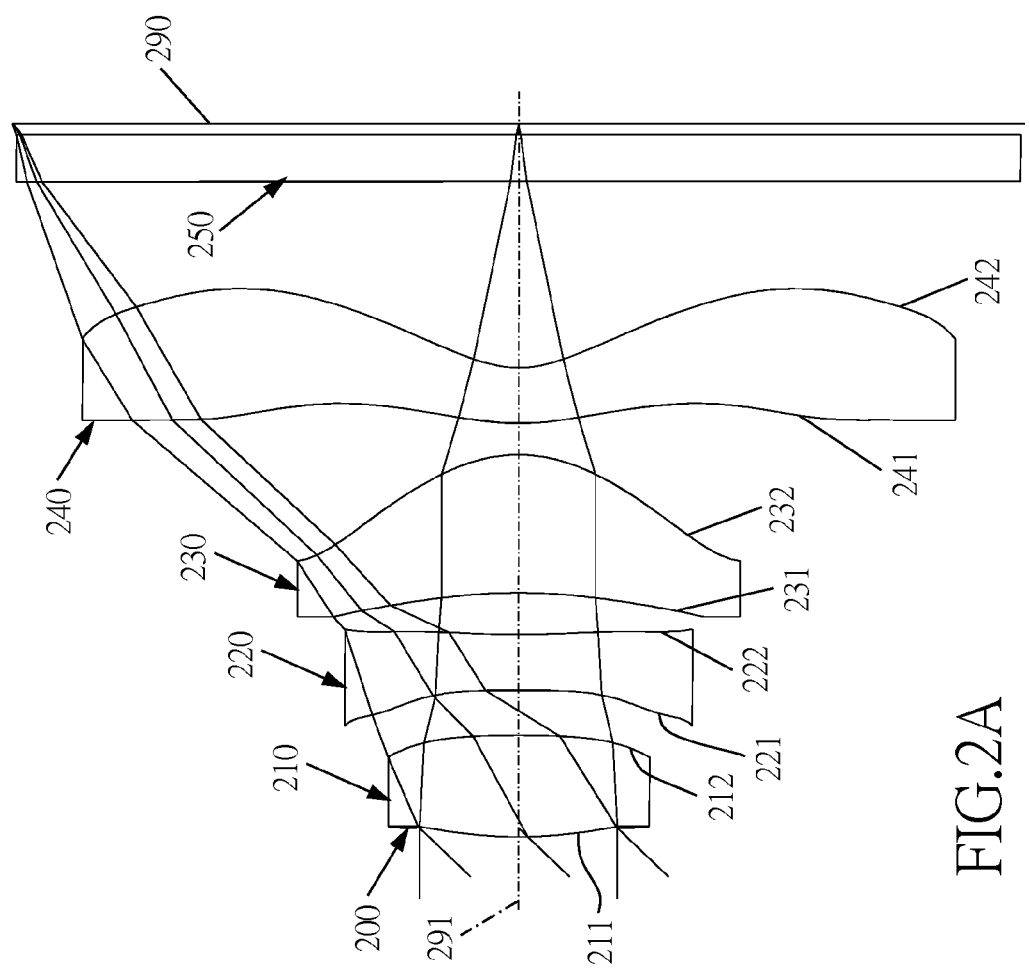
FIG. 2A shows an optical lens system cross-sectional view in accordance with the second embodiment.
Figure 2B:
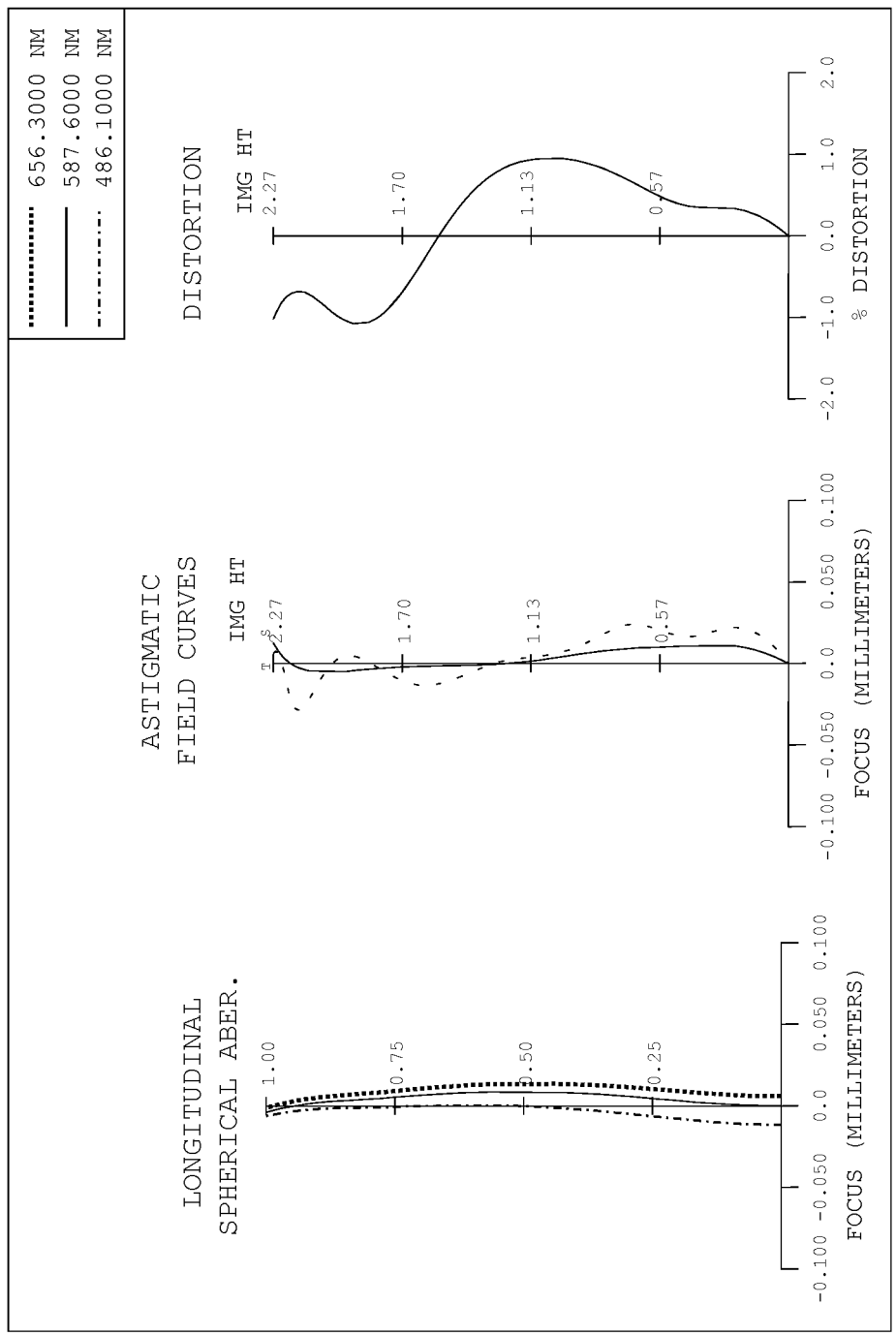
FIG. 2B shows spherical aberration curve, astigmatic field curves and distortion curve of the optical lens system in accordance with the second embodiment.

Referring to FIG. 2A, which shows an optical lens system cross-sectional view in accordance with a second embodiment of the present invention, and FIG. 2B shows the spherical aberration curves, the astigmatic field curves, and the distortion curve of the second embodiment of the present invention. An optical lens system in accordance with the second embodiment of the present invention comprises, in order from the object side to the image side:

A stop 200.

A first lens element 210 with a positive refractive power made of plastic has a convex object-side surface 211 and a convex image-side surface 212, and the object-side surface 211 and the image-side surface 212 of the first lens element 210 are aspheric.

A second lens element 220 with a negative refractive power made of plastic has a concave object-side surface 221 and a concave image-side surface 222, and the object-side surface 221 and the image-side surface 222 of the second lens element 220 are aspheric.

A third lens element 230 with a positive refractive power made of plastic has a concave object-side surface 231 and a convex image-side surface 232, and the object-side surface 231 and the image-side surface 232 of the third lens element 230 are aspheric.

A fourth lens element 240 with a negative refractive power made of plastic has a convex object-side surface 241 and a concave image-side surface 242, the object-side surface 241 and the image-side surface 242 of the fourth lens element 240 are aspheric, and at least one inflection point is formed on each of the object-side surface 241 and the image-side surface 242 of the fourth lens element 240.

An IR filter 250 made of glass is located between the image-side surface 242 of the fourth lens element 240 and an image plane 290 and has no influence on the focal length of the optical lens system.

The equation for the aspheric surface profiles of the second embodiment is expressed as follows:

$$z(h) = \frac{ch^2}{1+\sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4$, $A_6$, $A_8$, $A_{10}$, $A_{12}$, $A_{14}$ . . . : represent the high-order aspheric coefficients.

In the second embodiment of the present optical lens system, the focal length of the optical lens system is f, and it satisfies the condition:
f=2.2.

In the second embodiment of the present optical lens system, the f-number of the optical lens system is Fno, and it satisfies the condition:
Fno=2.5.

In the second embodiment of the present optical lens system, half of the maximum field of view of the present optical lens system is HFOV, it satisfies the relation: HFOV=45.9; and the maximum field of view of the present optical lens system is FOV, it satisfies the condition: FOV=91.8.

In the second embodiment of the present optical lens system, the focal length of the first lens element 210 is f1, the focal length of the optical lens system is f, and they satisfy the condition:
f1/f=1.18.

In the second embodiment of the present optical lens system, the maximum effective diameter of the image-side surface 232 of the third lens element 230 is CA_L3S2, the maximum effective diameter of the image-side surface 242 of the fourth lens element 240 is CA_L4S2, and they satisfy the condition: CA_L3S2/CA_L4S2=0.51.

In the second embodiment of the present optical lens system, a distance between the image-side surface 232 of the third lens element 230 and the object-side surface 241 of the fourth lens element 240 along the optical axis 291 is Dr7r8, a distance from the object-side surface 211 of the first lens element 210 to the image plane 290 along the optical axis 291 is TL, and they satisfy the condition: Dr7r8×100/TL=4.36.

In the second embodiment of the present optical lens system, a distance between the object-side surface 221 of the second lens element 220 and the object-side surface 231 of the third lens element 230 along the optical axis 291 is Dr4r6, a distance from the object-side surface 211 of the first lens element 210 to the image plane 290 along the optical axis 291 is TL, and they satisfy the condition: Dr4r6/TL=0.14.

In the second embodiment of the present optical lens system, a radius of curvature of the object-side surface 221 of the second lens element 220 is R4, a radius of curvature of the image-side surface 222 of the second lens element 220 is R5, and they satisfy the condition: (R4−R5)/(R4+R5)=1.61.

In the second embodiment of the present optical lens system, the focal length of the third lens element 230 is f3, the focal length of the optical lens system is f, and they satisfy the condition: f3/f=0.61.

In the second embodiment of the present optical lens system, an Abbe number of the third lens element 230 is Vd3, an Abbe number of the second lens element 220 is Vd2, and they satisfy the condition: Vd3−Vd2=34.00.

In the second embodiment of the present optical lens system, a distance from the object-side surface 221 of the second lens element 220 to the image-side surface 232 of the third lens element 230 along the optical axis 291 is Dr4r7, the focal length of the optical lens system is f, and they satisfy the condition: Dr4r7/f=0.49.

In the second embodiment of the present optical lens system, the distance from the object-side surface 211 of the first lens element 210 to the image plane 290 along the optical axis 291 is TL, and a half of the maximum image height of the present optical lens system is ImgH, and they satisfy the condition: TL/ImgH=1.41.

The detailed optical data of the second embodiment is shown in table 3, and the aspheric surface data is shown in table 4, wherein the units of the radius of curvature, the thickness and the focal length in table 3 are expressed in mm, and in table 4, k represents the conic constant, and $A_4$, $A_6$, $A_8$, $A_{10}$, $A_{12}$, $A_{14}$ . . . : represent the high-order aspheric coefficients. In the tables 3 and 4, the surfaces 2 and 3 represent the object-side surface 211 and the image-side surface 212 of the first lens element 210, respectively, the surfaces 4 and 5 represent the object-side surface 221 and the image-side surface 222 of the second lens element 220, respectively, the surfaces 6 and 7 represent the object-side surface 231 and the image-side surface 232 of the third lens element 230, respectively, and the surfaces 8 and 9 represent the object-side surface 241 and the image-side surface 242 of the fourth lens element 240, respectively.

TABLE 3
(Embodiment 2)
f (focal length) = 2.2 mm, Fno = 2.5, HFOV = 45.9 deg.

| Surface # | | Curvature Radius | Thickness | Material | index | Abbe | Focal length |
|---|---|---|---|---|---|---|---|
| 0 | Object | Infinity | Infinity | | | | |
| 1 | Stop | Infinity | −0.04 | | | | |
| 2 | Lens 1 | 1.82 (ASP) | 0.46 | Plastic | 1.544 | 56 | 2.60 |
| 3 | | −5.71 (ASP) | 0.20 | | | | |

-continued

| | | | | | | | |
|---|---|---|---|---|---|---|---|
| 4 | Lens 2 | −14.68 (ASP) | 0.25 | Plastic | 1.642 | 22 | −4.30 |
| 5 | | 3.44 (ASP) | 0.19 | | | | |
| 6 | Lens 3 | −2.56 (ASP) | 0.62 | Plastic | 1.544 | 56 | 1.34 |
| 7 | | −0.62 (ASP) | 0.14 | | | | |
| 8 | Lens 4 | 1.03 (ASP) | 0.25 | Plastic | 1.544 | 56 | −1.73 |
| 9 | | 0.45 (ASP) | 0.39 | | | | |
| 10 | IR-filter | Infinity | 0.21 | Glass | 1.517 | 64 | — |
| 11 | | Infinity | 0.50 | | | | |
| 12 | Image | Infinity | — | | | | |

TABLE 4
Aspheric Coefficients

| Surface # | 2 | 3 | 4 | 5 |
|---|---|---|---|---|
| k = | −18.5989 | 69.62838 | 94.17092 | −100 |
| A4 = | 0.2501 | −0.5407 | −0.9990 | −0.2466 |
| A6 = | −1.3873 | 0.1642 | 1.1533 | 0.0345 |
| A8 = | 2.1390 | −1.2215 | −7.3480 | 0.7284 |
| A10 = | 5.7710 | 0.4835 | 32.7357 | −1.3466 |
| A12 = | −74.6549 | 12.6344 | −42.8120 | 2.3236 |
| A14 = | 160.7376 | −16.7486 | 13.4077 | −1.5321 |

| Surface # | 6 | 7 | 8 | 9 |
|---|---|---|---|---|
| k = | 0.4093 | −1.8570 | −18.8810 | −4.0749 |
| A4 = | 0.0045 | 0.0823 | −0.1255 | −0.1772 |
| A6 = | 0.3576 | −0.3626 | −0.0181 | 0.1039 |
| A8 = | −0.4797 | 0.3080 | 0.0427 | −0.0469 |
| A10 = | −0.0688 | 0.5311 | −0.0081 | 0.0108 |
| A12 = | 0.3859 | −0.6830 | −0.0013 | −0.0007 |
| A14 = | −0.1639 | 0.2257 | 0.0003 | −0.0001 |

Figure 3A:
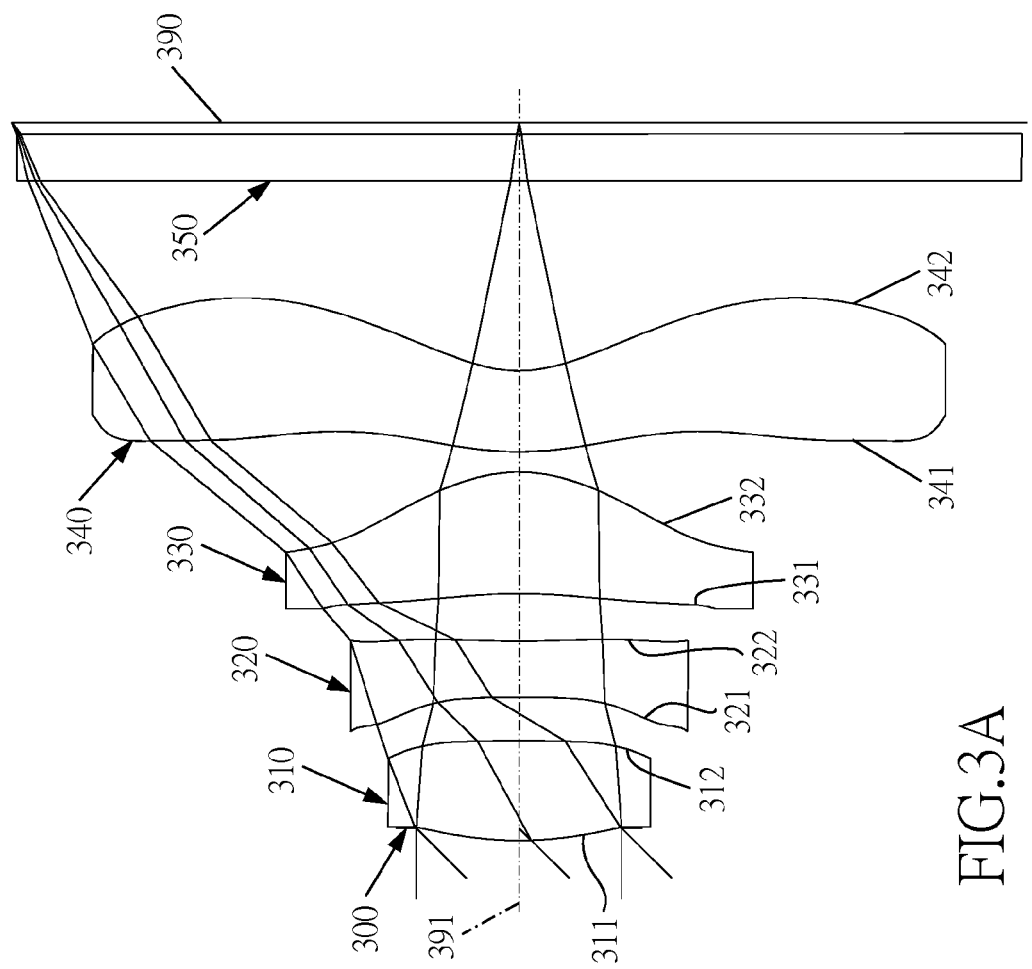
FIG. 3A shows an optical lens system cross-sectional view in accordance with the third embodiment.
Figure 3B:
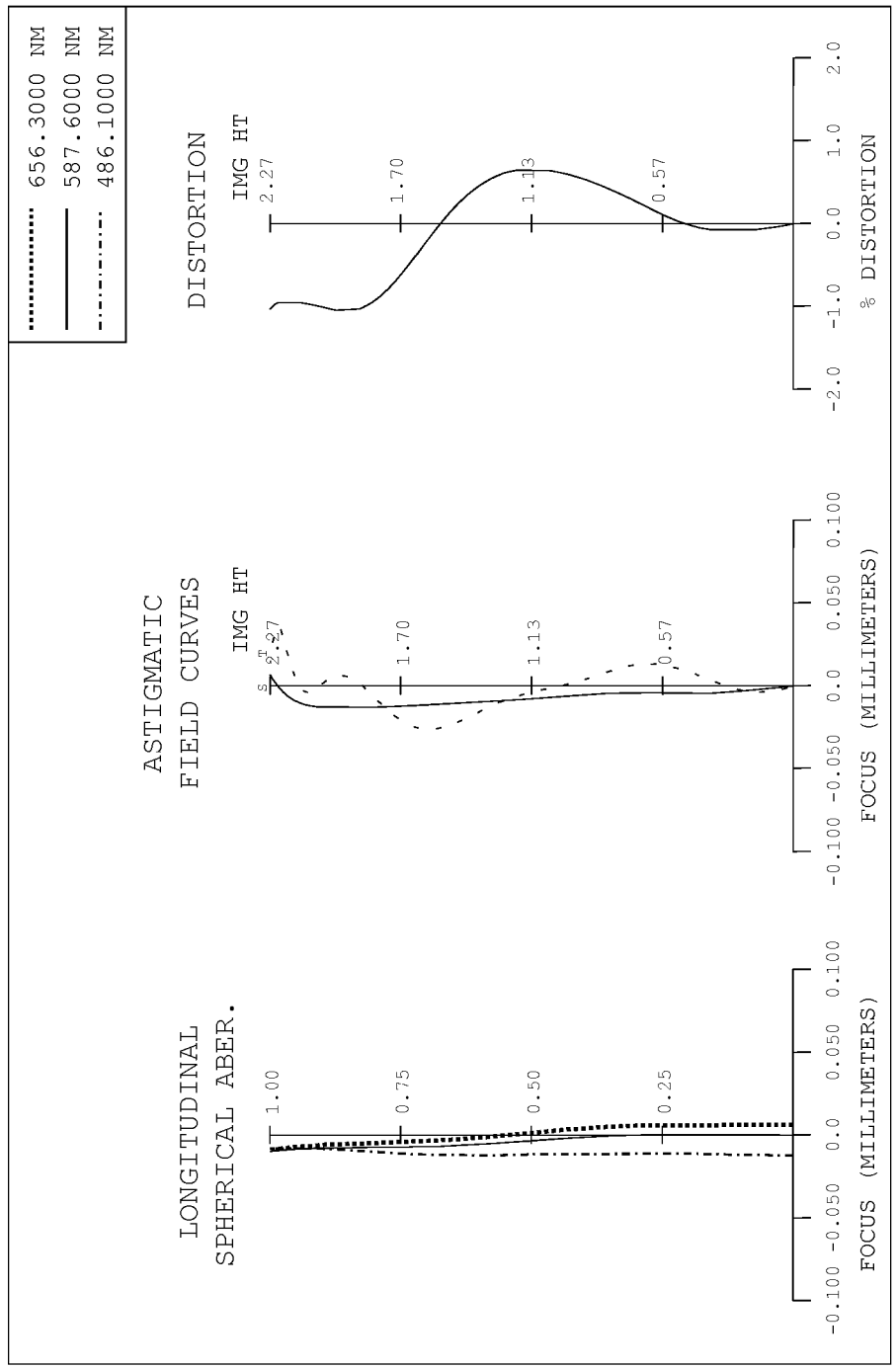
FIG. 3B shows spherical aberration curve, astigmatic field curves and distortion curve of the optical lens system in accordance with the third embodiment.

Referring to FIG. 3A, which shows an optical lens system cross-sectional view in accordance with a third embodiment of the present invention, and FIG. 3B shows the spherical aberration curves, the astigmatic field curves, and the distortion curve of the third embodiment of the present invention. An optical lens system in accordance with the third embodiment of the present invention comprises, in order from the object side to the image side:

A stop 300.

A first lens element 310 with a positive refractive power made of plastic has a convex object-side surface 311 and a convex image-side surface 312, and the object-side surface 311 and the image-side surface 312 of the first lens element 310 are aspheric.

A second lens element 320 with a negative refractive power made of plastic has a concave object-side surface 321 and a concave image-side surface 322, and the object-side surface 321 and the image-side surface 322 of the second lens element 320 are aspheric.

A third lens element 330 with a positive refractive power made of plastic has a concave object-side surface 331 and a convex image-side surface 332, and the object-side surface 331 and the image-side surface 332 of the third lens element 330 are aspheric.

A fourth lens element 340 with a negative refractive power made of plastic has a convex object-side surface 341 and a concave image-side surface 342, the object-side surface 341 and the image-side surface 342 of the fourth lens element 340 are aspheric, and at least one inflection point is formed on each of the object-side surface 341 and the image-side surface 342 of the fourth lens element 340.

An IR filter 350 made of glass is located between the image-side surface 342 of the fourth lens element 340 and an image plane 390 and has no influence on the focal length of the optical lens system.

The equation for the aspheric surface profiles of the third embodiment is expressed as follows:

$$z(h) = \frac{ch^2}{1 + \sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4$, $A_6$, $A_8$, $A_{10}$, $A_{12}$, $A_{14}$ . . . : represent the high-order aspheric coefficients.

In the third embodiment of the present optical lens system, the focal length of the optical lens system is f, and it satisfies the condition:

f=2.27.

In the third embodiment of the present optical lens system, the f-number of the optical lens system is Fno, and it satisfies the condition:

Fno=2.5.

In the third embodiment of the present optical lens system, half of the maximum field of view of the present optical lens system is HFOV, it satisfies the relation: HFOV=45; and the maximum field of view of the present optical lens system is FOV, it satisfies the condition: FOV=90.

In the third embodiment of the present optical lens system, the focal length of the first lens element 310 is f1, the focal length of the optical lens system is f, and they satisfy the condition:

f1/f=1.19.

In the third embodiment of the present optical lens system, the maximum effective diameter of the image-side surface 332 of the third lens element 330 is CA_L3S2, the maximum effective diameter of the image-side surface 342 of the fourth lens element 340 is CA_L4S2, and they satisfy the condition: CA_L3S2/CA_L4S2=0.55.

In the third embodiment of the present optical lens system, a distance between the image-side surface 332 of the third lens element 330 and the object-side surface 341 of the fourth lens element 340 along the optical axis 391 is Dr7r8, a distance from the object-side surface 311 of the first lens element 310 to the image plane 390 along the optical axis 391 is TL, and they satisfy the condition: Dr7r8×100/TL=2.8.

In the third embodiment of the present optical lens system, a distance between the object-side surface 321 of the second lens element 320 and the object-side surface 331 of the third lens element 330 along the optical axis 391 is Dr4r6, a distance from the object-side surface 311 of the first lens element 310 to the image plane 390 along the optical axis 391 is TL, and they satisfy the condition: Dr4r6/TL=0.14.

In the third embodiment of the present optical lens system, a radius of curvature of the object-side surface 321 of the second lens element 320 is R4, a radius of curvature of the image-side surface 322 of the second lens element 320 is R5, and they satisfy the condition: (R4−R5)/(R4+R5)=2.87.

In the third embodiment of the present optical lens system, the focal length of the third lens element 330 is f3, the focal length of the optical lens system is f, and they satisfy the condition: f3/f=0.68.

In the third embodiment of the present optical lens system, an Abbe number of the third lens element 330 is Vd3, an Abbe number of the second lens element 320 is Vd2, and they satisfy the condition: Vd3−Vd2=34.00.

In the third embodiment of the present optical lens system, a distance from the object-side surface 321 of the second lens element 320 to the image-side surface 332 of the third lens element 330 along the optical axis 391 is Dr4r7, the focal length of the optical lens system is f, and they satisfy the condition: Dr4r7/f=0.46.

In the third embodiment of the present optical lens system, the distance from the object-side surface 311 of the first lens element 310 to the image plane 390 along the optical axis 391 is TL, and a half of the maximum image height of the present optical lens system is ImgH, and they satisfy the condition: TL/ImgH=1.41.

The detailed optical data of the third embodiment is shown in table 5, and the aspheric surface data is shown in table 6, wherein the units of the radius of curvature, the thickness and the focal length in table 5 are expressed in mm, and in table 6, k represents the conic constant, and $A_4$, $A_6$, $A_8$, $A_{10}$, $A_{12}$, $A_{14}$ . . . : represent the high-order aspheric coefficients. In the tables 5 and 6, the surfaces 2 and 3 represent the object-side surface 311 and the image-side surface 312 of the first lens element 310, respectively, the surfaces 4 and 5 represent the object-side surface 321 and the image-side surface 322 of the second lens element 320, respectively, the surfaces 6 and 7 represent the object-side surface 331 and the image-side surface 332 of the third lens element 330, respectively, and the surfaces 8 and 9 represent the object-side surface 341 and the image-side surface 342 of the fourth lens element 340, respectively.

TABLE 5
(Embodiment 3)
f (focal length) = 2.27 mm, Fno = 2.5, HFOV = 45 deg.

| Surface # | | Curvature Radius | Thickness | Material | index | Abbe | Focal length |
|---|---|---|---|---|---|---|---|
| 0 | Object | Infinity | Infinity | | | | |
| 1 | Stop | Infinity | −0.05 | | | | |
| 2 | Lens 1 | 1.57 (ASP) | 0.45 | Plastic | 1.544 | 56 | 2.60 |
| 3 | | −19.74 (ASP) | 0.19 | | | | |
| 4 | Lens 2 | −9.52 (ASP) | 0.25 | Plastic | 1.642 | 22 | −4.80 |
| 5 | | 4.60 (ASP) | 0.21 | | | | |
| 6 | Lens 3 | −2.30 (ASP) | 0.54 | Plastic | 1.544 | 56 | 1.55 |
| 7 | | −0.67 (ASP) | 0.09 | | | | |
| 8 | Lens 4 | 1.34 (ASP) | 0.25 | Plastic | 1.544 | 56 | −2.05 |
| 9 | | 0.55 (ASP) | 0.38 | | | | |
| 10 | IR-filter | Infinity | 0.21 | Glass | 1.517 | 64 | — |
| 11 | | Infinity | 0.52 | | | | |
| 12 | Image | Infinity | — | | | | |

TABLE 6
Aspheric Coefficients

| Surface # | 2 | 3 | 4 | 5 |
|---|---|---|---|---|
| k = | −7.98594 | 93.92501 | −100 | −98.693 |
| A4 = | 0.1582 | −0.5363 | −1.0168 | −0.2391 |
| A6 = | −0.5432 | −0.3404 | 0.7993 | −0.3897 |
| A8 = | −1.1955 | −0.1959 | −8.4468 | 1.3254 |
| A10 = | 9.0882 | −1.8397 | 34.0499 | −1.2912 |
| A12 = | −35.4658 | 8.6366 | −24.3843 | 2.5227 |
| A14 = | 43.9879 | 3.2015 | −14.2950 | −1.8293 |

| Surface # | 6 | 7 | 8 | 9 |
|---|---|---|---|---|
| k = | −33.7155 | −2.8486 | −7.7249 | −3.9492 |
| A4 = | 0.1286 | −0.0513 | −0.2390 | −0.1965 |
| A6 = | 0.1042 | −0.1264 | 0.0738 | 0.1217 |
| A8 = | −0.4516 | 0.0237 | −0.0120 | −0.0569 |
| A10 = | 0.2393 | 0.0759 | −0.0001 | 0.0150 |

-continued

| | | | | |
|---|---|---|---|---|
| A12 = | 0.3805 | −0.8035 | 0.0000 | −0.0017 |
| A14 = | −0.5146 | 0.3793 | 0.0003 | 0.0000 |

Figure 4A:
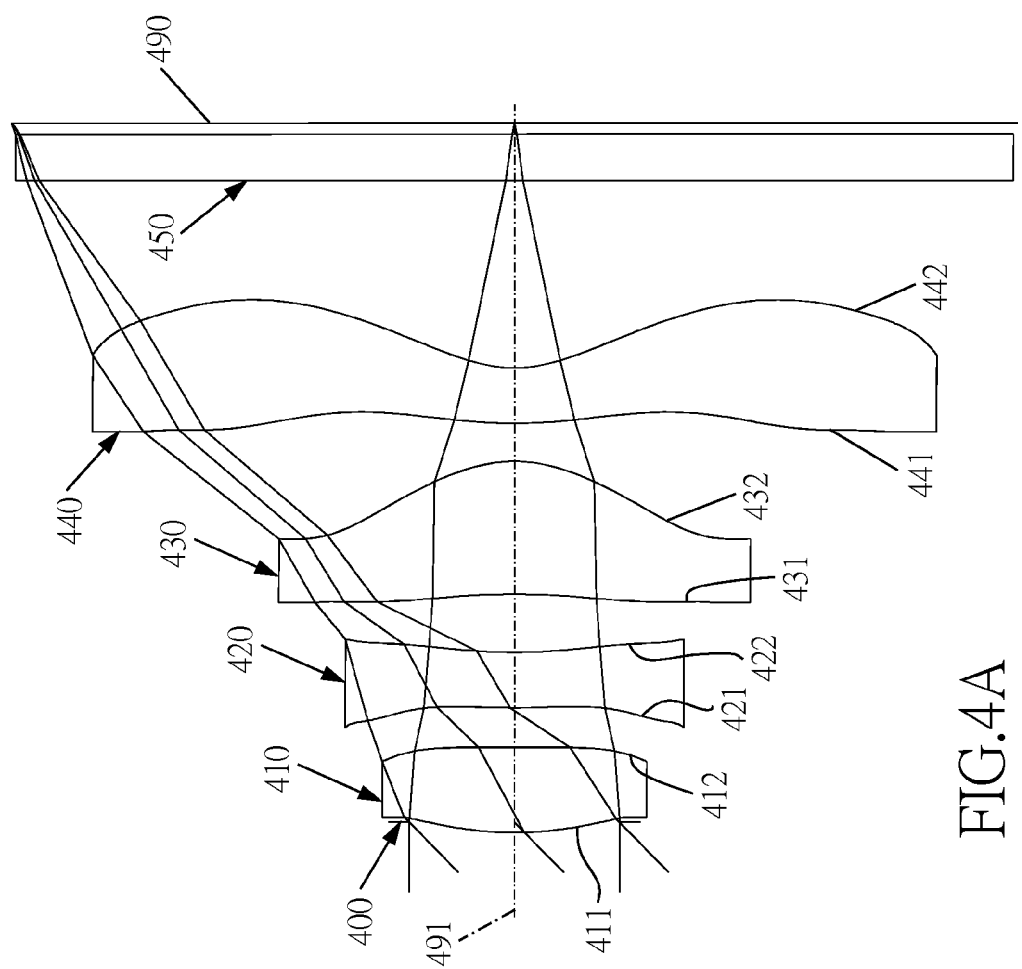
FIG. 4A shows an optical lens system cross-sectional view in accordance with the fourth embodiment.
Figure 4B:
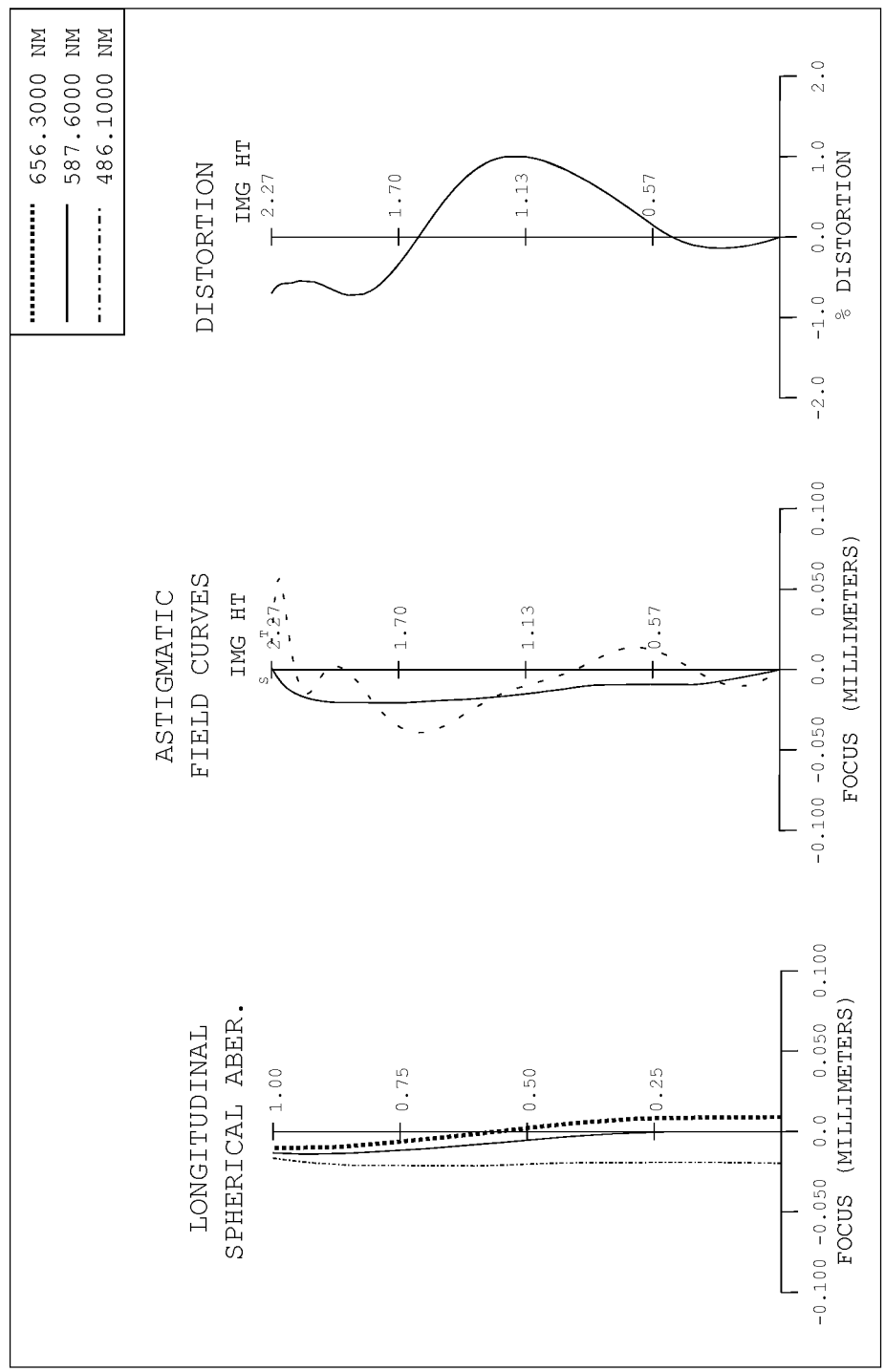
FIG. 4B shows spherical aberration curve, astigmatic field curves and distortion curve of the optical lens system in accordance with the fourth embodiment.

Referring to FIG. 4A, which shows an optical lens system cross-sectional view in accordance with a fourth embodiment of the present invention, and FIG. 4B shows the spherical aberration curves, the astigmatic field curves, and the distortion curve of the fourth embodiment of the present invention. An optical lens system in accordance with the fourth embodiment of the present invention comprises, in order from the object side to the image side:

A stop 400.

A first lens element 410 with a positive refractive power made of plastic has a convex object-side surface 411 and a concave image-side surface 412, and the object-side surface 411 and the image-side surface 412 of the first lens element 410 are aspheric.

A second lens element 420 with a negative refractive power made of plastic has a convex object-side surface 421 and a concave image-side surface 422, and the object-side surface 421 and the image-side surface 422 of the second lens element 420 are aspheric.

A third lens element 430 with a positive refractive power made of plastic has a concave object-side surface 431 and a convex image-side surface 432, and the object-side surface 431 and the image-side surface 432 of the third lens element 430 are aspheric.

A fourth lens element 440 with a negative refractive power made of plastic has a convex object-side surface 441 and a concave image-side surface 442, the object-side surface 441 and the image-side surface 442 of the fourth lens element 440 are aspheric, and at least one inflection point is formed on each of the object-side surface 441 and the image-side surface 442 of the fourth lens element 440.

An IR filter 450 made of glass is located between the image-side surface 442 of the fourth lens element 440 and an image plane 490 and has no influence on the focal length of the optical lens system.

The equation for the aspheric surface profiles of the fourth embodiment is expressed as follows:

$$z(h) = \frac{ch^2}{1 + \sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4$, $A_6$, $A_8$, $A_{10}$, $A_{12}$, $A_{14}$ . . . : represent the high-order aspheric coefficients.

In the fourth embodiment of the present optical lens system, the focal length of the optical lens system is f, and it satisfies the condition:

f=2.35.

In the fourth embodiment of the present optical lens system, the f-number of the optical lens system is Fno, and it satisfies the condition:

Fno=2.5.

In the fourth embodiment of the present optical lens system, half of the maximum field of view of the present optical lens system is HFOV, it satisfies the relation: HFOV=44; and the maximum field of view of the present optical lens system is FOV, it satisfies the condition: FOV=88.

In the fourth embodiment of the present optical lens system, the focal length of the first lens element 410 is f1, the focal length of the optical lens system is f, and they satisfy the condition:

f1/f=1.38.

In the fourth embodiment of the present optical lens system, the maximum effective diameter of the image-side surface 432 of the third lens element 430 is CA_L3S2, the maximum effective diameter of the image-side surface 442 of the fourth lens element 440 is CA_L4S2, and they satisfy the condition: CA_L3S2/CA_L4S2=0.56.

In the fourth embodiment of the present optical lens system, a distance between the image-side surface 432 of the third lens element 430 and the object-side surface 441 of the fourth lens element 440 along the optical axis 491 is Dr7r8, a distance from the object-side surface 411 of the first lens element 410 to the image plane 490 along the optical axis 491 is TL, and they satisfy the condition: Dr7r8×100/TL=5.34.

In the fourth embodiment of the present optical lens system, a distance between the object-side surface 421 of the second lens element 420 and the object-side surface 431 of the third lens element 430 along the optical axis 491 is Dr4r6, a distance from the object-side surface 411 of the first lens element 410 to the image plane 490 along the optical axis 491 is TL, and they satisfy the condition: Dr4r6/TL=0.16.

In the fourth embodiment of the present optical lens system, a radius of curvature of the object-side surface 421 of the second lens element 420 is R4, a radius of curvature of the image-side surface 422 of the second lens element 420 is R5, and they satisfy the condition: (R4−R5)/(R4+R5)=0.29.

In the fourth embodiment of the present optical lens system, the focal length of the third lens element 430 is f3, the focal length of the optical lens system is f, and they satisfy the condition: f3/f=0.56.

In the fourth embodiment of the present optical lens system, an Abbe number of the third lens element 430 is Vd3, an Abbe number of the second lens element 420 is Vd2, and they satisfy the condition: Vd3−Vd2=34.00.

In the fourth embodiment of the present optical lens system, a distance from the object-side surface 421 of the second lens element 420 to the image-side surface 432 of the third lens element 430 along the optical axis 491 is Dr4r7, the focal length of the optical lens system is f, and they satisfy the condition: Dr4r7/f=0.51.

In the fourth embodiment of the present optical lens system, the distance from the object-side surface 411 of the first lens element 410 to the image plane 490 along the optical axis 491 is TL, and a half of the maximum image height of the present optical lens system is ImgH, and they satisfy the condition: TL/ImgH=1.41.

The detailed optical data of the fourth embodiment is shown in table 7, and the aspheric surface data is shown in table 8, wherein the units of the radius of curvature, the thickness and the focal length in table 7 are expressed in mm, and in table 8, k represents the conic constant, and $A_4$, $A_6$, $A_8$, $A_{10}, A_{12}, A_{14} \ldots$: represent the high-order aspheric coefficients. In the tables 7 and 8, the surfaces 2 and 3 represent the object-side surface 411 and the image-side surface 412 of the first lens element 410, respectively, the surfaces 4 and 5 represent the object-side surface 421 and the image-side surface 422 of the second lens element 420, respectively, the surfaces 6 and 7 represent the object-side surface 431 and the image-side surface 432 of the third lens element 430, respectively, and the surfaces 8 and 9 represent the object-side surface 441 and the image-side surface 442 of the fourth lens element 440, respectively.

TABLE 7
(Embodiment 4)
f (focal length) = 2.35 mm, Fno = 2.5, HFOV= 44 deg.

| Surface # | | Curvature Radius | Thickness | Material | index | Abbe | Focal length |
|---|---|---|---|---|---|---|---|
| 0 | Object | Infinity | Infinity | | | | |
| 1 | Stop | Infinity | −0.05 | | | | |
| 2 | Lens 1 | 1.52 (ASP) | 0.38 | Plastic | 1.515 | 56 | 3.25 |
| 3 | | 15.29 (ASP) | 0.18 | | | | |
| 4 | Lens 2 | 4.00 (ASP) | 0.25 | Plastic | 1.642 | 22 | −8.06 |
| 5 | | 2.20 (ASP) | 0.26 | | | | |
| 6 | Lens 3 | −2.86 (ASP) | 0.60 | Plastic | 1.544 | 56 | 1.31 |
| 7 | | −0.61 (ASP) | 0.17 | | | | |
| 8 | Lens 4 | 2.01 (ASP) | 0.25 | Plastic | 1.533 | 56 | −1.51 |
| 9 | | 0.55 (ASP) | 0.35 | | | | |
| 10 | IR-filter | Infinity | 0.21 | Glass | 1.517 | 64 | — |
| 11 | | Infinity | 0.54 | | | | |
| 12 | Image | Infinity | — | | | | |

TABLE 8
Aspheric Coefficients

| Surface # | 2 | 3 | 4 | 5 |
|---|---|---|---|---|
| k = | −8.09269 | −99 | −8.1479 | −22.419 |
| A4 = | 0.1744 | −0.5486 | −0.8181 | −0.0656 |
| A6 = | −0.5557 | 0.1059 | 0.6910 | −0.7216 |
| A8 = | −1.1135 | −3.0728 | −8.2166 | 1.6149 |
| A10 = | 9.1637 | 9.6926 | 30.7799 | −2.2037 |
| A12 = | −36.2505 | −10.7384 | −29.2304 | 4.7425 |
| A14 = | 43.9886 | 3.2021 | 0.0758 | −3.8696 |

| Surface # | 6 | 7 | 8 | 9 |
|---|---|---|---|---|
| k = | 8.2704 | −2.8994 | −2.2524 | −4.0290 |
| A4 = | 0.2237 | −0.0155 | −0.3273 | −0.2072 |
| A6 = | 0.3469 | −0.2971 | 0.1038 | 0.1264 |
| A8 = | −0.7337 | 0.7861 | 0.0267 | −0.0579 |
| A10 = | 0.4633 | 0.0980 | −0.0148 | 0.0143 |
| A12 = | 0.1598 | −0.7793 | 0.0002 | −0.0011 |
| A14 = | −0.1991 | 0.3283 | 0.0003 | −0.0001 |

Figure 5A:
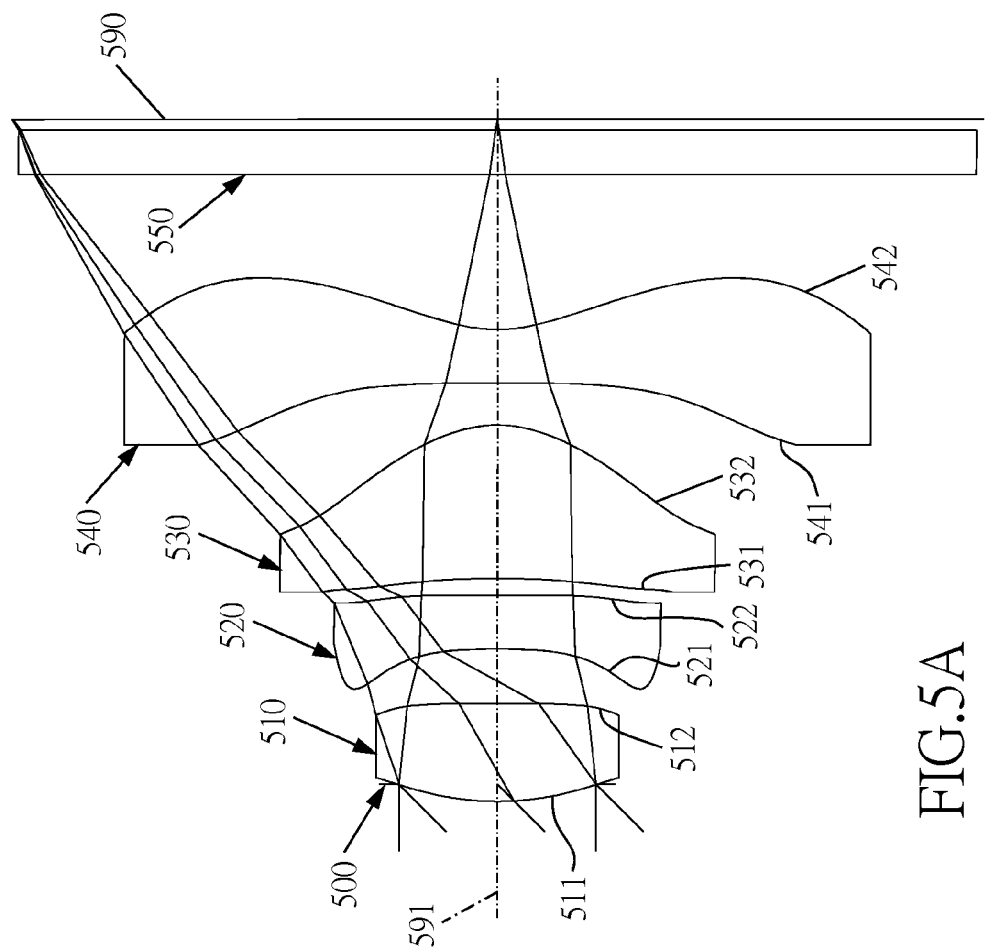
FIG. 5A shows an optical lens system cross-sectional view in accordance with the fifth embodiment.
Figure 5B:
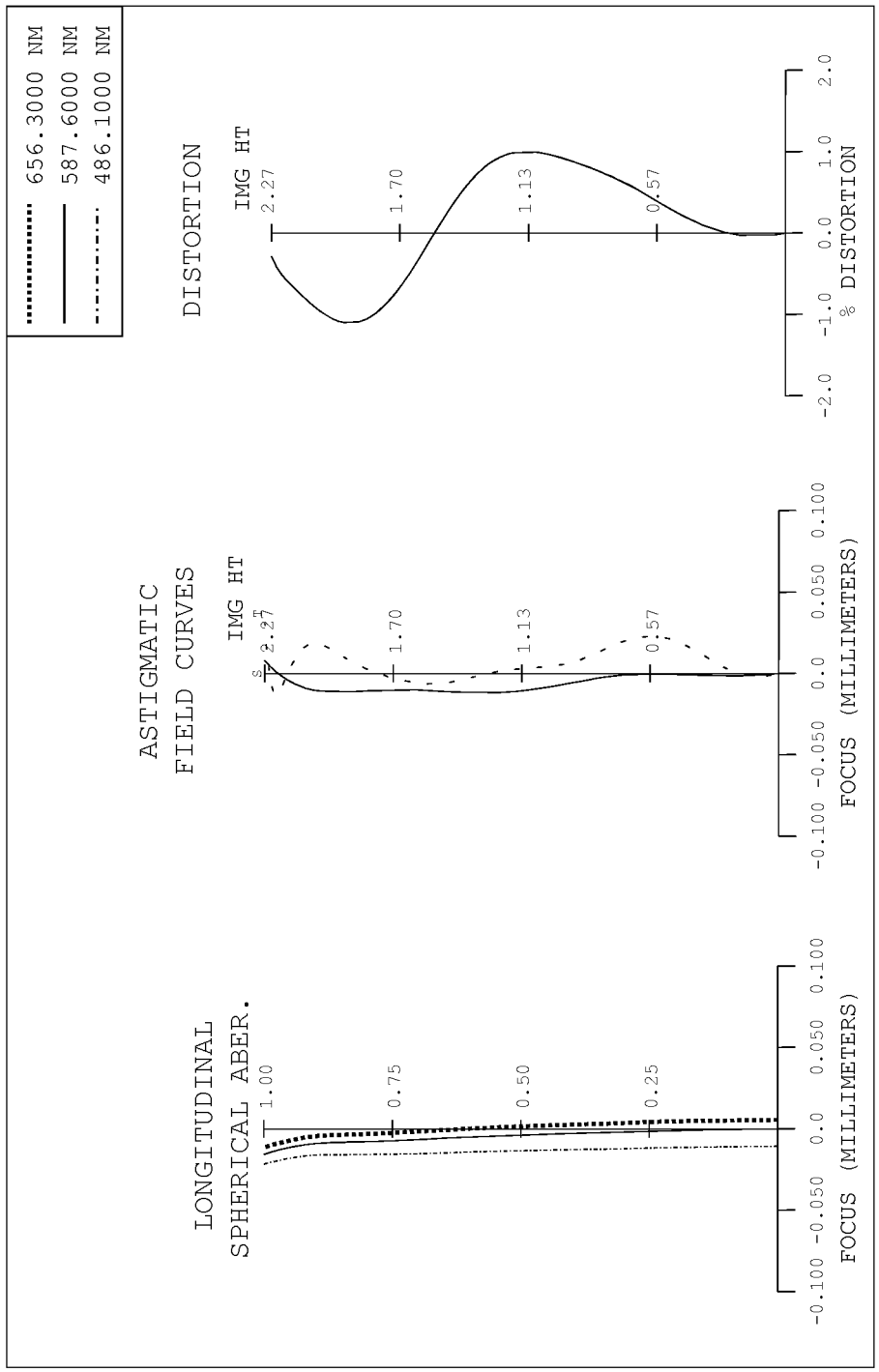
FIG. 5B shows spherical aberration curve, astigmatic field curves and distortion curve of the optical lens system in accordance with the fifth embodiment.

Referring to FIG. 5A, which shows an optical lens system cross-sectional view in accordance with a fifth embodiment of the present invention, and FIG. 5B shows the spherical aberration curves, the astigmatic field curves, and the distortion curve of the fifth embodiment of the present invention. An optical lens system in accordance with the fifth embodiment of the present invention comprises, in order from the object side to the image side:

A stop 500.

A first lens element 510 with a positive refractive power made of plastic has a convex object-side surface 511 and a concave image-side surface 512, and the object-side surface 511 and the image-side surface 512 of the first lens element 510 are aspheric.

A second lens element 520 with a negative refractive power made of plastic has a concave object-side surface 521 and a concave image-side surface 522, and the object-side surface 521 and the image-side surface 522 of the second lens element 520 are aspheric.

A third lens element 530 with a positive refractive power made of plastic has a concave object-side surface 531 and a convex image-side surface 532, and the object-side surface 531 and the image-side surface 532 of the third lens element 530 are aspheric.

A fourth lens element 540 with a negative refractive power made of plastic has a concave object-side surface 541 and a concave image-side surface 542, the object-side surface 541 and the image-side surface 542 of the fourth lens element 540 are aspheric, and at least one inflection point is formed on each of the object-side surface 541 and the image-side surface 542 of the fourth lens element 540.

An IR filter 550 made of glass is located between the image-side surface 542 of the fourth lens element 540 and an image plane 590 and has no influence on the focal length of the optical lens system.

The equation for the aspheric surface profiles of the fifth embodiment is expressed as follows:

$$z(h) = \frac{ch^2}{1 + \sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14}$ ... : represent the high-order aspheric coefficients.

In the fifth embodiment of the present optical lens system, the focal length of the optical lens system is f, and it satisfies the condition:

f=2.29.

In the fifth embodiment of the present optical lens system, the f-number of the optical lens system is Fno, and it satisfies the condition:

Fno=2.5.

In the fifth embodiment of the present optical lens system, half of the maximum field of view of the present optical lens system is HFOV, it satisfies the relation: HFOV=44.7; and the maximum field of view of the present optical lens system is FOV, it satisfies the condition: FOV=89.4.

In the fifth embodiment of the present optical lens system, the focal length of the first lens element 510 is f1, the focal length of the optical lens system is f, and they satisfy the condition:

f1/f=1.13.

In the fifth embodiment of the present optical lens system, the maximum effective diameter of the image-side surface 532 of the third lens element 530 is CA_L3S2, the maximum effective diameter of the image-side surface 542 of the fourth lens element 540 is CA_L4S2, and they satisfy the condition: CA_L3S2/CA_L4S2=0.58.

In the fifth embodiment of the present optical lens system, a distance between the image-side surface 532 of the third lens element 530 and the object-side surface 541 of the fourth lens element 540 along the optical axis 591 is Dr7r8, a distance from the object-side surface 511 of the first lens element 510 to the image plane 590 along the optical axis 591 is TL, and they satisfy the condition: Dr7r8×100/TL=6.17.

In the fifth embodiment of the present optical lens system, a distance between the object-side surface 521 of the second lens element 520 and the object-side surface 531 of the third lens element 530 along the optical axis 591 is Dr4r6, a distance from the object-side surface 511 of the first lens element 510 to the image plane 590 along the optical axis 591 is TL, and they satisfy the condition: Dr4r6/TL=0.10.

In the fifth embodiment of the present optical lens system, a radius of curvature of the object-side surface 521 of the second lens element 520 is R4, a radius of curvature of the image-side surface 522 of the second lens element 520 is R5, and they satisfy the condition: (R4−R5)/(R4+R5)=−2.71.

In the fifth embodiment of the present optical lens system, the focal length of the third lens element 530 is f3, the focal length of the optical lens system is f, and they satisfy the condition: f3/f=0.48.

In the fifth embodiment of the present optical lens system, an Abbe number of the third lens element 530 is Vd3, an Abbe number of the second lens element 520 is Vd2, and they satisfy the condition: Vd3−Vd2=34.00.

In the fifth embodiment of the present optical lens system, a distance from the object-side surface 521 of the second lens element 520 to the image-side surface 532 of the third lens element 530 along the optical axis 591 is Dr4r7, the focal length of the optical lens system is f, and they satisfy the condition: Dr4r7/f=0.48.

In the fifth embodiment of the present optical lens system, the distance from the object-side surface 511 of the first lens element 510 to the image plane 590 along the optical axis 591 is TL, and a half of the maximum image height of the present optical lens system is ImgH, and they satisfy the condition: TL/ImgH=1.41.

The detailed optical data of the fifth embodiment is shown in table 9, and the aspheric surface data is shown in table 10, wherein the units of the radius of curvature, the thickness and the focal length in table 9 are expressed in mm, and in table 10, k represents the conic constant, and $A_4, A_6, A_8, A_{10}, A_{12}, A_{14}$ ... : represent the high-order aspheric coefficients. In the tables 9 and 10, the surfaces 2 and 3 represent the object-side surface 511 and the image-side surface 512 of the first lens element 510, respectively, the surfaces 4 and 5 represent the object-side surface 521 and the image-side surface 522 of the second lens element 520, respectively, the surfaces 6 and 7 represent the object-side surface 531 and the image-side surface 532 of the third lens element 530, respectively, and the surfaces 8 and 9 represent the object-side surface 541 and the image-side surface 542 of the fourth lens element 540, respectively.

TABLE 9
(Embodiment 5)
f (focal length) = 2.29 mm, Fno = 2.5, HFOV= 44.7 deg.

| Surface # |  | Curvature Radius | Thickness | Material | index | Abbe | Focal length |
|---|---|---|---|---|---|---|---|
| 0 | Object | Infinity | Infinity | | | | |
| 1 | Stop | Infinity | −0.08 | | | | |
| 2 | Lens 1 | 1.30 (ASP) | 0.46 | Plastic | 1.515 | 56 | 2.58 |
| 3 | | 60.00 (ASP) | 0.26 | | | | |
| 4 | Lens 2 | −3.58 (ASP) | 0.25 | Plastic | 1.642 | 22 | −3.78 |
| 5 | | 7.77 (ASP) | 0.08 | | | | |
| 6 | Lens 3 | −5.19 (ASP) | 0.72 | Plastic | 1.544 | 56 | 1.11 |
| 7 | | −0.57 (ASP) | 0.20 | | | | |
| 8 | Lens 4 | −24.57 (ASP) | 0.25 | Plastic | 1.515 | 57 | −1.26 |
| 9 | | 0.67 (ASP) | 0.27 | | | | |
| 10 | IR-filter | Infinity | 0.21 | Glass | 1.517 | 64 | — |
| 11 | | Infinity | 0.50 | | | | |
| 12 | Image | Infinity | — | | | | |

TABLE 10
Aspheric Coefficients

| Surface # | 2 | 3 | 4 | 5 |
|---|---|---|---|---|
| k = | −6.52568 | 99 | 10.68248 | 77.39232 |
| A4 = | 0.3380 | −0.3420 | −0.9005 | −0.6998 |
| A6 = | −0.9228 | −0.3468 | 0.6795 | 1.1302 |

-continued

| | | | | |
|---|---|---|---|---|
| A8 = | 1.7896 | −3.6859 | −6.2439 | −0.9404 |
| A10 = | −3.0481 | 28.5360 | 18.4839 | 0.1614 |
| A12 = | −7.6957 | −116.6518 | −24.7615 | 1.0407 |
| A14 = | 14.9845 | 166.2789 | 33.4983 | −0.5358 |

| Surface # | 6 | 7 | 8 | 9 |
|---|---|---|---|---|
| k = | 37.9639 | −2.8507 | −6.3455 | −5.6460 |
| A4 = | −0.3132 | −0.3105 | −0.1112 | −0.1620 |
| A6 = | 1.0288 | 0.2880 | −0.0266 | 0.1046 |
| A8 = | 0.0839 | −0.2456 | 0.0074 | −0.0649 |
| A10 = | −2.7897 | 0.6180 | 0.0260 | 0.0228 |
| A12 = | 3.3859 | −0.3460 | −0.0088 | −0.0041 |
| A14 = | −1.1955 | −0.0221 | 0.0001 | 0.0003 |

Figure 6A:
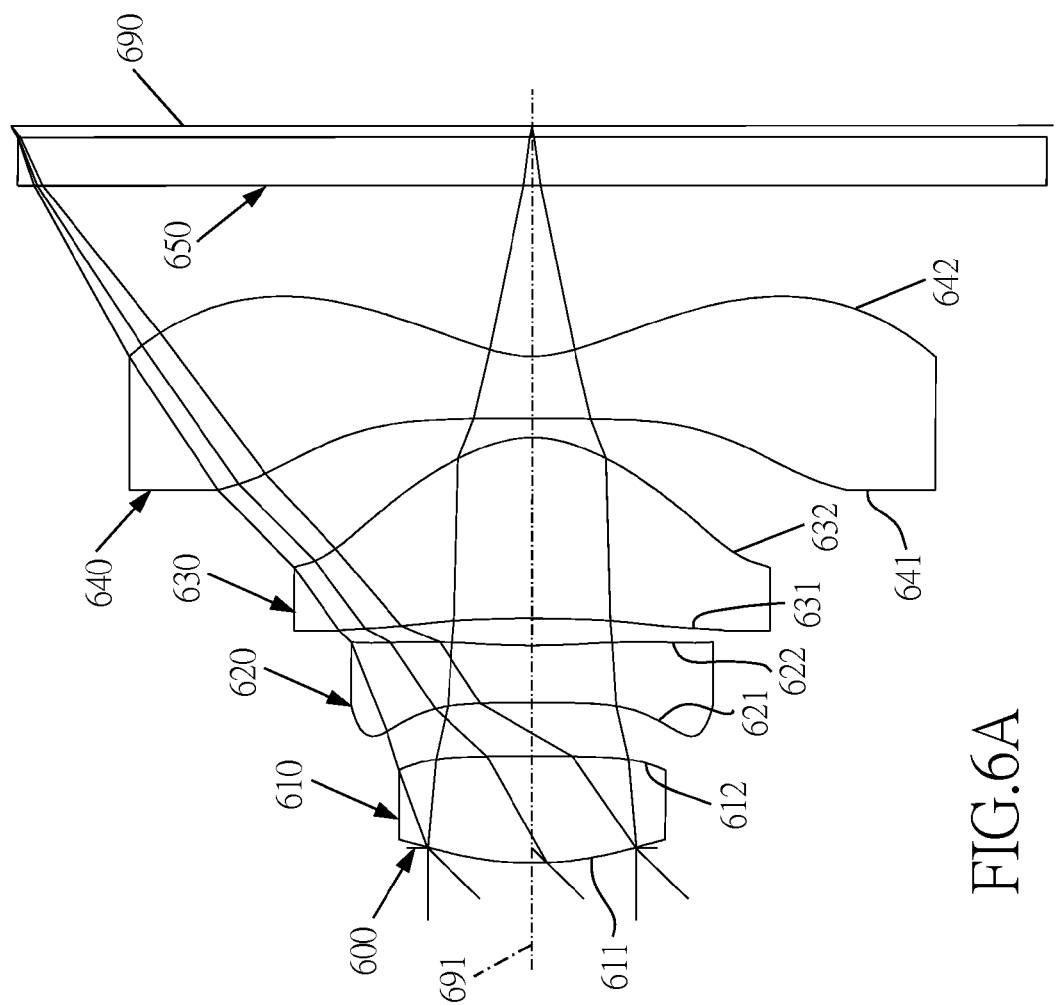
FIG. 6A shows an optical lens system cross-sectional view in accordance with the sixth embodiment.
Figure 6B:
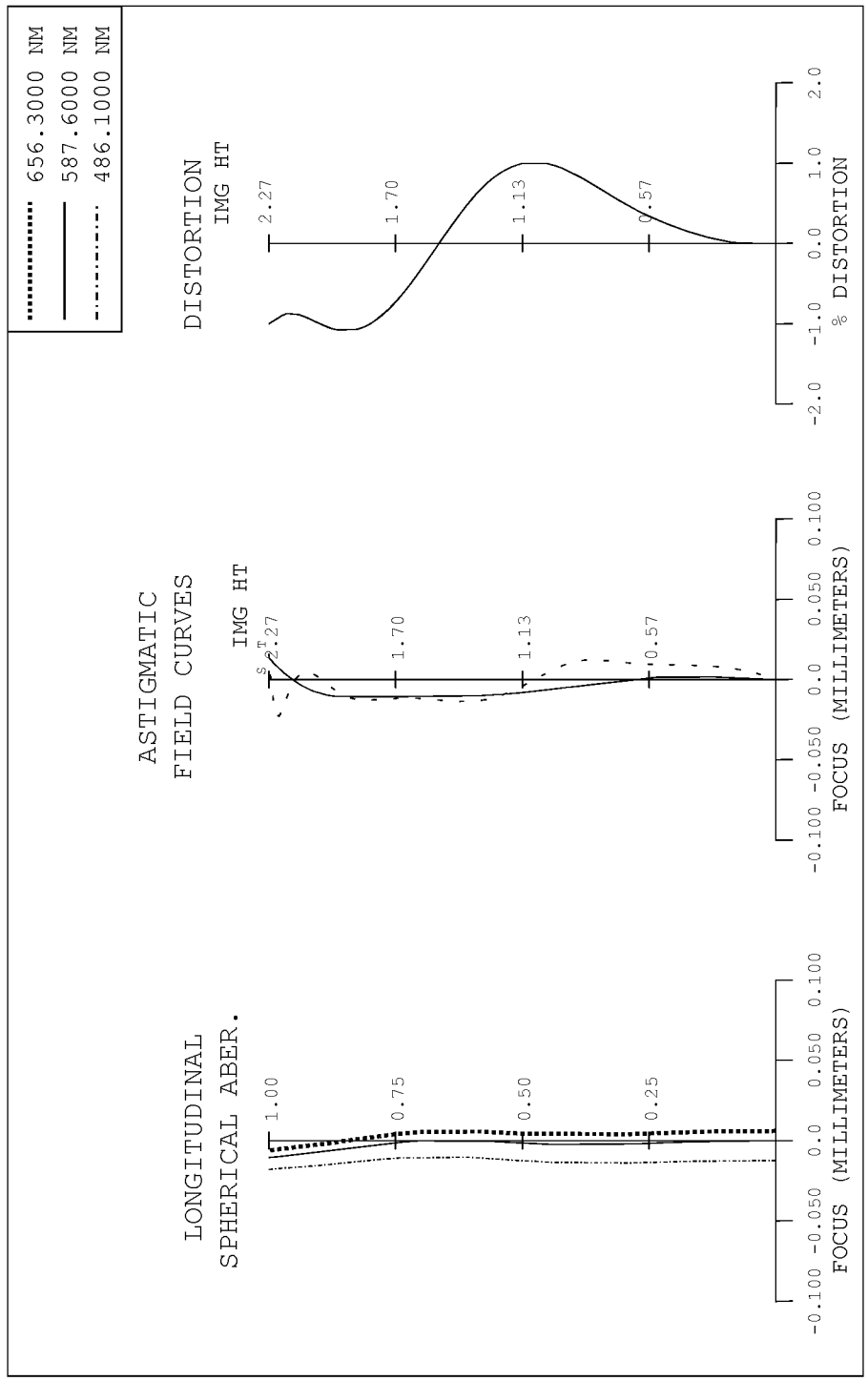
FIG. 6B shows spherical aberration curve, astigmatic field curves and distortion curve of the optical lens system in accordance with the sixth embodiment.

Referring to FIG. 6A, which shows an optical lens system cross-sectional view in accordance with a sixth embodiment of the present invention, and FIG. 6B shows the spherical aberration curves, the astigmatic field curves, and the distortion curve of the sixth embodiment of the present invention. An optical lens system in accordance with the sixth embodiment of the present invention comprises, in order from the object side to the image side:

A stop 600.

A first lens element 610 with a positive refractive power made of plastic has a convex object-side surface 611 and a concave image-side surface 612, and the object-side surface 611 and the image-side surface 612 of the first lens element 610 are aspheric.

A second lens element 620 with a negative refractive power made of plastic has a convex object-side surface 621 and a concave image-side surface 622, and the object-side surface 621 and the image-side surface 622 of the second lens element 620 are aspheric.

A third lens element 630 with a positive refractive power made of plastic has a concave object-side surface 631 and a convex image-side surface 632, and the object-side surface 631 and the image-side surface 632 of the third lens element 630 are aspheric.

A fourth lens element 640 with a negative refractive power made of plastic has a concave object-side surface 641 and a concave image-side surface 642, the object-side surface 641 and the image-side surface 642 of the fourth lens element 640 are aspheric, and at least one inflection point is formed on each of the object-side surface 641 and the image-side surface 642 of the fourth lens element 640.

An IR filter 650 made of glass is located between the image-side surface 642 of the fourth lens element 640 and an image plane 690 and has no influence on the focal length of the optical lens system.

The equation for the aspheric surface profiles of the sixth embodiment is expressed as follows:

$$z(h) = \frac{ch^2}{1 + \sqrt{1 - (1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14} \ldots$ : represent the high-order aspheric coefficients.

In the sixth embodiment of the present optical lens system, the focal length of the optical lens system is f, and it satisfies the condition:

f=2.24.

In the sixth embodiment of the present optical lens system, the f-number of the optical lens system is Fno, and it satisfies the condition:

Fno=2.5.

In the sixth embodiment of the present optical lens system, half of the maximum field of view of the present optical lens system is HFOV, it satisfies the relation: HFOV=45.3; and the maximum field of view of the present optical lens system is FOV, it satisfies the condition: FOV=90.6.

In the sixth embodiment of the present optical lens system, the focal length of the first lens element 610 is f1, the focal length of the optical lens system is f, and they satisfy the condition:

f1/f=1.24.

In the sixth embodiment of the present optical lens system, the maximum effective diameter of the image-side surface 632 of the third lens element 630 is CA_L3S2, the maximum effective diameter of the image-side surface 642 of the fourth lens element 640 is CA_L4S2, and they satisfy the condition: CA_L3S2/CA_L4S2=0.59.

In the sixth embodiment of the present optical lens system, a distance between the image-side surface 632 of the third lens element 630 and the object-side surface 641 of the fourth lens element 640 along the optical axis 691 is Dr7r8, a distance from the object-side surface 611 of the first lens element 610 to the image plane 690 along the optical axis 691 is TL, and they satisfy the condition: Dr7r8×100/TL=2.57.

In the sixth embodiment of the present optical lens system, a distance between the object-side surface 621 of the second lens element 620 and the object-side surface 631 of the third lens element 630 along the optical axis 691 is Dr4r6, a distance from the object-side surface 611 of the first lens element 610 to the image plane 690 along the optical axis 691 is TL, and they satisfy the condition: Dr4r6/TL=0.12.

In the sixth embodiment of the present optical lens system, a radius of curvature of the object-side surface 621 of the second lens element 620 is R4, a radius of curvature of the image-side surface 622 of the second lens element 620 is R5, and they satisfy the condition: (R4−R5)/(R4+R5)=0.84.

In the sixth embodiment of the present optical lens system, the focal length of the third lens element 630 is f3, the focal length of the optical lens system is f, and they satisfy the condition: f3/f=0.39.

In the sixth embodiment of the present optical lens system, an Abbe number of the third lens element 630 is Vd3, an Abbe number of the second lens element 620 is Vd2, and they satisfy the condition: Vd3−Vd2=34.00.

face 632 of the third lens element 630, respectively, and the surfaces 8 and 9 represent the object-side surface 641 and the image-side surface 642 of the fourth lens element 640, respectively.

TABLE 11
(Embodiment 6)
f (focal length) = 2.24 mm, Fno = 2.5, HFOV= 45.3 deg.

| Surface # | | Curvature Radius | Thickness | Material | index | Abbe | Focal length |
|---|---|---|---|---|---|---|---|
| 0 | Object | Infinity | Infinity | | | | |
| 1 | Stop | Infinity | −0.07 | | | | |
| 2 | Lens 1 | 1.40 (ASP) | 0.46 | Plastic | 1.515 | 56 | 2.77 |
| 3 | | 60.00 (ASP) | 0.23 | | | | |
| 4 | Lens 2 | 30.35 (ASP) | 0.25 | Plastic | 1.642 | 22 | −4.49 |
| 5 | | 2.62 (ASP) | 0.12 | | | | |
| 6 | Lens 3 | −8.23 (ASP) | 0.79 | Plastic | 1.544 | 56 | 0.88 |
| 7 | | −0.47 (ASP) | 0.08 | | | | |
| 8 | Lens 4 | −200.00 (ASP) | 0.27 | Plastic | 1.533 | 57 | −0.92 |
| 9 | | 0.49 (ASP) | 0.29 | | | | |
| 10 | IR-filter | Infinity | 0.21 | Glass | 1.517 | 64 | — |
| 11 | | Infinity | 0.50 | | | | |
| 12 | Image | Infinity | — | | | | |

TABLE 12
Aspheric Coefficients

| Surface # | 2 | 3 | 4 | 5 |
|---|---|---|---|---|
| k = | −22.7907 | 99 | 14.16368 | −85.8084 |
| A4 = | 0.9511 | −0.4968 | −1.0703 | −0.3788 |
| A6 = | −4.8941 | 1.4297 | 2.2444 | 0.7802 |
| A8 = | 19.2690 | −17.7137 | −12.4252 | −1.3881 |
| A10 = | −50.4540 | 87.6998 | 26.9527 | 1.1588 |
| A12 = | 48.5868 | −231.3456 | −20.5726 | 1.1696 |
| A14 = | 14.9857 | 245.5426 | 12.1276 | −1.4486 |

| Surface # | 6 | 7 | 8 | 9 |
|---|---|---|---|---|
| k = | 95.0000 | −3.6504 | −100.0000 | −5.6023 |
| A4 = | −0.4268 | −0.6069 | −0.1548 | −0.1700 |
| A6 = | 1.5913 | 1.1270 | −0.0984 | 0.0924 |
| A8 = | −2.5941 | −1.7666 | 0.0972 | −0.0482 |
| A10 = | 3.1098 | 1.5186 | 0.0025 | 0.0150 |
| A12 = | −2.6266 | −0.0247 | −0.0088 | −0.0023 |
| A14 = | 1.1457 | −0.3411 | 0.0001 | 0.0001 |

In the sixth embodiment of the present optical lens system, a distance from the object-side surface 621 of the second lens element 620 to the image-side surface 632 of the third lens element 630 along the optical axis 691 is Dr4r7, the focal length of the optical lens system is f, and they satisfy the condition: Dr4r7/f=0.53.

In the sixth embodiment of the present optical lens system, the distance from the object-side surface 611 of the first lens element 610 to the image plane 690 along the optical axis 691 is TL, and a half of the maximum image height of the present optical lens system is ImgH, and they satisfy the condition: TL/ImgH=1.41.

Figure 7A:
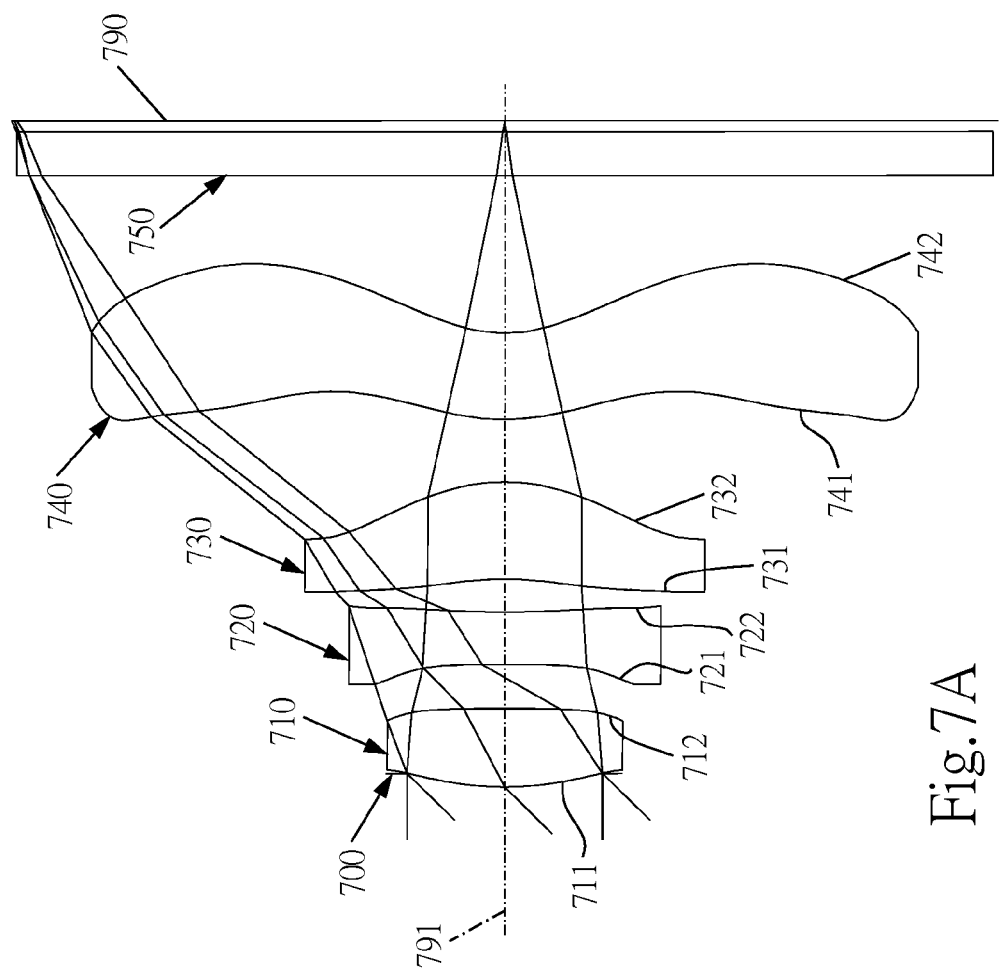
FIG. 7A shows an optical lens system cross-sectional view in accordance with the seventh embodiment.
Figure 7B:
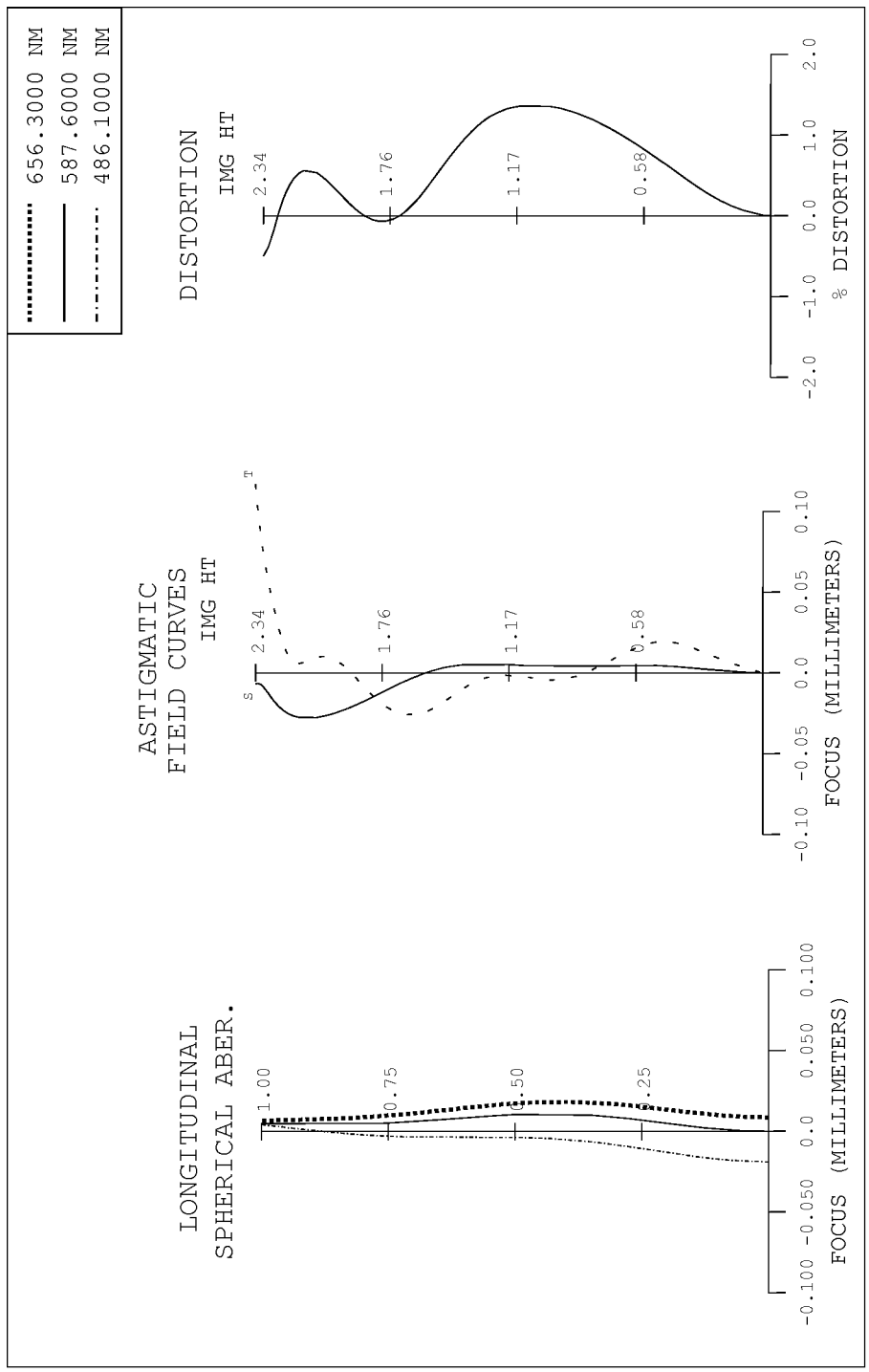
FIG. 7B shows spherical aberration curve, astigmatic field curves and distortion curve of the optical lens system in accordance with the seventh embodiment.

The detailed optical data of the sixth embodiment is shown in table 11, and the aspheric surface data is shown in table 12, wherein the units of the radius of curvature, the thickness and the focal length in table 11 are expressed in mm, and in table 12, k represents the conic constant, and $A_4, A_6, A_8, A_{10}, A_{12}, A_{14}\ldots$ : represent the high-order aspheric coefficients. In the tables 11 and 12, the surfaces 2 and 3 represent the object-side surface 611 and the image-side surface 612 of the first lens element 610, respectively, the surfaces 4 and 5 represent the object-side surface 621 and the image-side surface 622 of the second lens element 620, respectively, the surfaces 6 and 7 represent the object-side surface 631 and the image-side sur- Referring to FIG. 7A, which shows an optical lens system cross-sectional view in accordance with a seventh embodiment of the present invention, and FIG. 7B shows the spherical aberration curves, the astigmatic field curves, and the distortion curve of the seventh embodiment of the present invention. An optical lens system in accordance with the seventh embodiment of the present invention comprises, in order from the object side to the image side:

A stop 700.

A first lens element 710 with a positive refractive power made of plastic has a convex object-side surface 711 and a concave image-side surface 712, and the object-side surface 711 and the image-side surface 712 of the first lens element 710 are aspheric.

A second lens element 720 with a negative refractive power made of plastic has a concave object-side surface 721 and a concave image-side surface 722, and the object-side surface 721 and the image-side surface 722 of the second lens element 720 are aspheric.

A third lens element 730 with a positive refractive power made of plastic has a concave object-side surface 731 and a convex image-side surface 732, and the object-side surface 731 and the image-side surface 732 of the third lens element 730 are aspheric.

A fourth lens element 740 with a negative refractive power made of plastic has a convex object-side surface 741 and a concave image-side surface 742, the object-side surface 741 and the image-side surface 742 of the fourth lens element 740 are aspheric, and at least one inflection point is formed on each of the object-side surface 741 and the image-side surface 742 of the fourth lens element 740.

An IR filter 750 made of glass is located between the image-side surface 742 of the fourth lens element 740 and an image plane 790 and has no influence on the focal length of the optical lens system.

The equation for the aspheric surface profiles of the seventh embodiment is expressed as follows:

$$z(h) = \frac{ch^2}{1 + \sqrt{1-(1+k)c^2h^2}} + A_4 h^4 + A_6 h^6 + A_8 h^8 + A_{10} h^{10} + A_{12} h^{12} + A_{14} h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14} \ldots$ : represent the high-order aspheric coefficients.

In the seventh embodiment of the present optical lens system, the focal length of the optical lens system is f, and it satisfies the condition:
f=2.32.

In the seventh embodiment of the present optical lens system, the f-number of the optical lens system is Fno, and it satisfies the condition:
Fno=2.5.

In the seventh embodiment of the present optical lens system, half of the maximum field of view of the present optical lens system is HFOV, it satisfies the relation: HFOV=45.4; and the maximum field of view of the present optical lens system is FOV, it satisfies the condition: FOV=90.8.

In the seventh embodiment of the present optical lens system, the focal length of the first lens element 710 is f1, the focal length of the optical lens system is f, and they satisfy the condition:
f1/f=1.18.

In the seventh embodiment of the present optical lens system, the maximum effective diameter of the image-side surface 732 of the third lens element 730 is CA_L3S2, the maximum effective diameter of the image-side surface 742 of the fourth lens element 740 is CA_L4S2, and they satisfy the condition: CA_L3S2/CA_L4S2=0.48.

In the seventh embodiment of the present optical lens system, a distance between the image-side surface 732 of the third lens element 730 and the object-side surface 741 of the fourth lens element 740 along the optical axis 791 is Dr7r8, a distance from the object-side surface 711 of the first lens element 710 to the image plane 790 along the optical axis 791 is TL, and they satisfy the condition: Dr7r8×100/TL=9.36.

In the seventh embodiment of the present optical lens system, a distance between the object-side surface 721 of the second lens element 720 and the object-side surface 731 of the third lens element 730 along the optical axis 791 is Dr4r6, a distance from the object-side surface 711 of the first lens element 710 to the image plane 790 along the optical axis 791 is TL, and they satisfy the condition: Dr4r6/TL=0.13.

In the seventh embodiment of the present optical lens system, a radius of curvature of the object-side surface 721 of the second lens element 720 is R4, a radius of curvature of the image-side surface 722 of the second lens element 720 is R5, and they satisfy the condition: (R4−R5)/(R4+R5)=1.17.

In the seventh embodiment of the present optical lens system, the focal length of the third lens element 730 is f3, the focal length of the optical lens system is f, and they satisfy the condition: f3/f=1.44.

In the seventh embodiment of the present optical lens system, an Abbe number of the third lens element 730 is Vd3, an Abbe number of the second lens element 720 is Vd2, and they satisfy the condition: Vd3−Vd2=33.00.

In the seventh embodiment of the present optical lens system, a distance from the object-side surface 721 of the second lens element 720 to the image-side surface 732 of the third lens element 730 along the optical axis 791 is Dr4r7, the focal length of the optical lens system is f, and they satisfy the condition: Dr4r7/f=0.38.

In the seventh embodiment of the present optical lens system, the distance from the object-side surface 711 of the first lens element 710 to the image plane 790 along the optical axis 791 is TL, and a half of the maximum image height of the present optical lens system is ImgH, and they satisfy the condition: TL/ImgH=1.36.

The detailed optical data of the seventh embodiment is shown in table 13, and the aspheric surface data is shown in table 14, wherein the units of the radius of curvature, the thickness and the focal length in table 13 are expressed in mm, and in table 14, k represents the conic constant, and $A_4, A_6, A_8, A_{10}, A_{12}, A_{14} \ldots$ : represent the high-order aspheric coefficients. In the tables 13 and 14, the surfaces 2 and 3 represent the object-side surface 711 and the image-side surface 712 of the first lens element 710, respectively, the surfaces 4 and 5 represent the object-side surface 721 and the image-side surface 722 of the second lens element 720, respectively, the surfaces 6 and 7 represent the object-side surface 731 and the image-side surface 732 of the third lens element 730, respectively, and the surfaces 8 and 9 represent the object-side surface 741 and the image-side surface 742 of the fourth lens element 740, respectively.

TABLE 13

(Embodiment 7)

f (focal length) = 2.32 mm, Fno = 2.5, HFOV= 45.4 deg.

| Surface # | | Curvature Radius | Thickness | Material | index | Abbe | Focal length |
|---|---|---|---|---|---|---|---|
| 0 | Object | Infinity | Infinity | | | | |
| 1 | Stop | Infinity | 0.00 | | | | |
| 2 (STOP) | Lens 1 | 1.46 (ASP) | 0.37 | Plastic | 1.544 | 56 | 2.74 |

-continued

| | | | | | | |
|---|---|---|---|---|---|---|
| 3 | | 66.80 (ASP) | 0.21 | | | |
| 4 | Lens 2 | −74.82 (ASP) | 0.25 | Plastic | 1.632 23 | −8.65 |
| 5 | | 5.91 (ASP) | 0.16 | | | |
| 6 | Lens 3 | −1.39 (ASP) | 0.46 | Plastic | 1.544 56 | 3.35 |
| 7 | | −0.88 (ASP) | 0.30 | | | |
| 8 | Lens 4 | 1.02 (ASP) | 0.41 | Plastic | 1.544 56 | −5.54 |
| 9 | | 0.66 (ASP) | 0.75 | | | |
| 10 | IR-filter | Infinity | 0.21 | Glass | 1.517 64 | — |
| 11 | | Infinity | 0.05 | | | |
| 12 | Image | Infinity | — | | | |

TABLE 14
Aspheric Coefficients

| Surface # | 2 | 3 | 4 | 5 |
|---|---|---|---|---|
| k = | −12.5021 | 50 | 50 | −27.2641 |
| A4 = | 0.3540 | −0.4295 | −0.6374 | 0.2354 |
| A6 = | −0.9333 | −0.7532 | −0.8272 | −1.6647 |
| A8 = | −1.9698 | 1.1331 | −3.9800 | 2.2062 |
| A10 = | 15.8309 | −4.4645 | 26.4919 | 0.4177 |
| A12 = | −54.0629 | 11.5903 | −24.8465 | −0.7447 |
| A14 = | 56.9939 | −13.3273 | −6.5579 | −0.5918 |

| Surface # | 6 | 7 | 8 | 9 |
|---|---|---|---|---|
| k = | −11.7605 | −1.2290 | −2.8551 | −2.5079 |
| A4 = | 0.4949 | 0.1593 | −0.3778 | −0.3172 |
| A6 = | −0.2541 | −0.1910 | 0.1273 | 0.2278 |
| A8 = | −0.9931 | 0.5638 | 0.0118 | −0.1151 |
| A10 = | 0.4248 | 0.1512 | −0.0088 | 0.0339 |
| A12 = | 2.9780 | −0.7067 | −0.0006 | −0.0050 |
| A14 = | −3.0805 | 0.2811 | 0.0003 | 0.0003 |

Figure 8A:
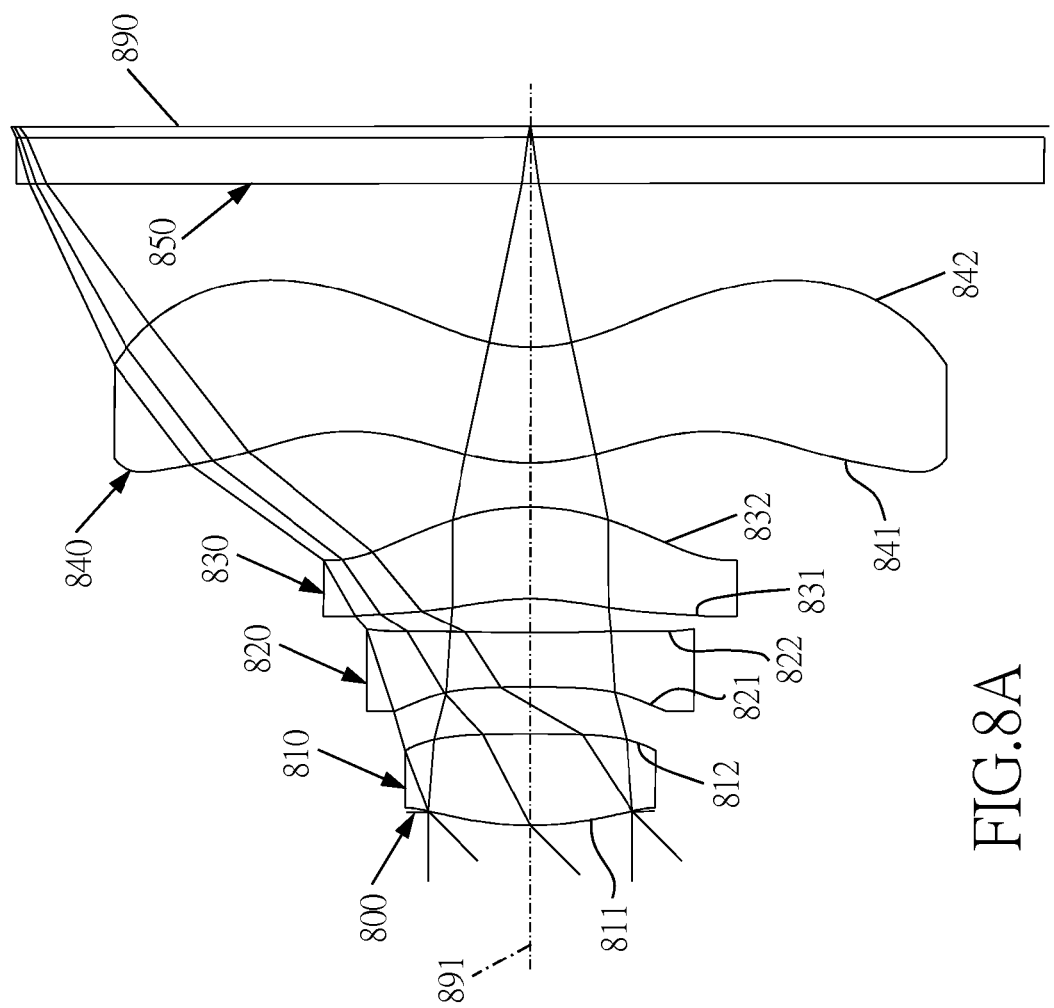
FIG. 8A shows an optical lens system cross-sectional view in accordance with the eighth embodiment.
Figure 8B:
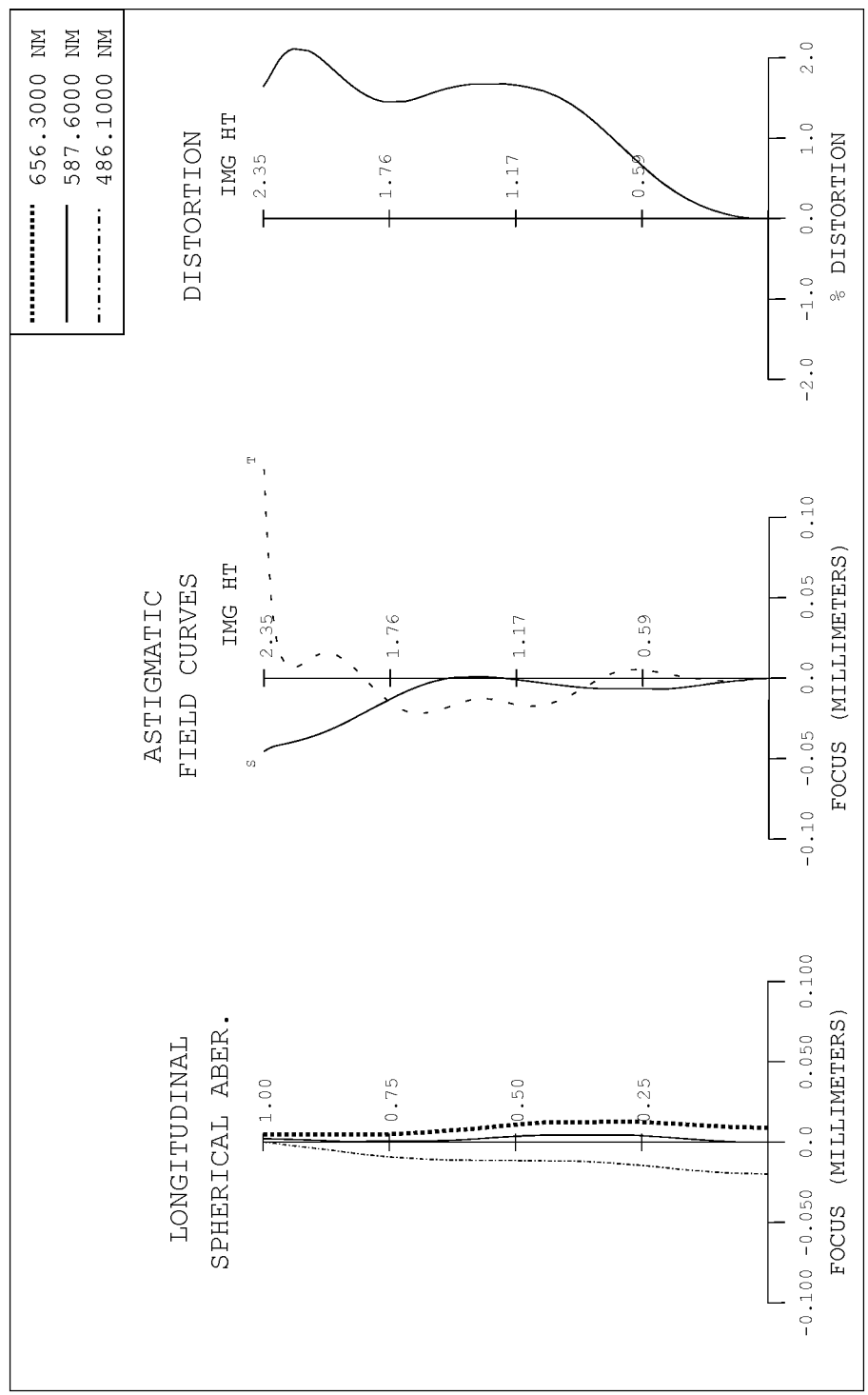
FIG. 8B shows spherical aberration curve, astigmatic field curves and distortion curve of the optical lens system in accordance with the eighth embodiment.

Referring to FIG. 8A, which shows an optical lens system cross-sectional view in accordance with a eighth embodiment of the present invention, and FIG. 8B shows the spherical aberration curves, the astigmatic field curves, and the distortion curve of the eighth embodiment of the present invention. An optical lens system in accordance with the eighth embodiment of the present invention comprises, in order from the object side to the image side:

A stop 800.

A first lens element 810 with a positive refractive power made of plastic has a convex object-side surface 811 and a convex image-side surface 812, and the object-side surface 811 and the image-side surface 812 of the first lens element 810 are aspheric.

A second lens element 820 with a negative refractive power made of plastic has a concave object-side surface 821 and a concave image-side surface 822, and the object-side surface 821 and the image-side surface 822 of the second lens element 820 are aspheric.

A third lens element 830 with a positive refractive power made of plastic has a concave object-side surface 831 and a convex image-side surface 832, and the object-side surface 831 and the image-side surface 832 of the third lens element 830 are aspheric.

A fourth lens element 840 with a negative refractive power made of plastic has a convex object-side surface 841 and a concave image-side surface 842, the object-side surface 841 and the image-side surface 842 of the fourth lens element 840 are aspheric, and at least one inflection point is formed on each of the object-side surface 841 and the image-side surface 842 of the fourth lens element 840.

An IR filter 850 made of glass is located between the image-side surface 842 of the fourth lens element 840 and an image plane 890 and has no influence on the focal length of the optical lens system.

The equation for the aspheric surface profiles of the eighth embodiment is expressed as follows:

$$z(h) = \frac{ch^2}{1 + \sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14} \ldots$ : represent the high-order aspheric coefficients.

In the eighth embodiment of the present optical lens system, the focal length of the optical lens system is f, and it satisfies the condition:

f=2.32.

In the eighth embodiment of the present optical lens system, the f-number of the optical lens system is Fno, and it satisfies the condition:

Fno=2.5.

In the eighth embodiment of the present optical lens system, half of the maximum field of view of the present optical lens system is HFOV, it satisfies the relation: HFOV=44.9; and the maximum field of view of the present optical lens system is FOV, it satisfies the condition: FOV=89.8.

In the eighth embodiment of the present optical lens system, the focal length of the first lens element 810 is f1, the focal length of the optical lens system is f, and they satisfy the condition:

f1/f=1.10.

In the eighth embodiment of the present optical lens system, the maximum effective diameter of the image-side surface 832 of the third lens element 830 is CA_L3S2, the maximum effective diameter of the image-side surface 842 of the fourth lens element 840 is CA_L4S2, and they satisfy the condition: CA_L3S2/CA_L4S2=0.50.

In the eighth embodiment of the present optical lens system, a distance between the image-side surface 832 of the third lens element 830 and the object-side surface 841 of the fourth lens element 840 along the optical axis 891 is Dr7r8, a distance from the object-side surface 811 of the first lens element 810 to the image plane 890 along the optical axis 891 is TL, and they satisfy the condition: Dr7r8×100/TL=6.37.

In the eighth embodiment of the present optical lens system, a distance between the object-side surface 821 of the second lens element 820 and the object-side surface 831 of the third lens element 830 along the optical axis 891 is Dr4r6, a distance from the object-side surface 811 of the first lens element 810 to the image plane 890 along the optical axis 891 is TL, and they satisfy the condition: Dr4r6/TL=0.13.

In the eighth embodiment of the present optical lens system, a radius of curvature of the object-side surface 821 of the second lens element 820 is R4, a radius of curvature of the image-side surface 822 of the second lens element 820 is R5, and they satisfy the condition: (R4−R5)/(R4+R5)=−2.13.

In the eighth embodiment of the present optical lens system, the focal length of the third lens element 830 is f3, the focal length of the optical lens system is f, and they satisfy the condition: f3/f=4.21.

In the eighth embodiment of the present optical lens system, an Abbe number of the third lens element 830 is Vd3, an Abbe number of the second lens element 820 is Vd2, and they satisfy the condition: Vd3−Vd2=33.00.

In the eighth embodiment of the present optical lens system, a distance from the object-side surface 821 of the second lens element 820 to the image-side surface 832 of the third lens element 830 along the optical axis 891 is Dr4r7, the focal length of the optical lens system is f, and they satisfy the condition: Dr4r7/f=0.36.

In the eighth embodiment of the present optical lens system, the distance from the object-side surface 811 of the first lens element 810 to the image plane 890 along the optical axis 891 is TL, and a half of the maximum image height of the present optical lens system is ImgH, and they satisfy the condition: TL/ImgH=1.36.

The detailed optical data of the eighth embodiment is shown in table 15, and the aspheric surface data is shown in table 16, wherein the units of the radius of curvature, the thickness and the focal length in table 15 are expressed in mm, and in table 16, k represents the conic constant, and $A_4$, $A_6$, $A_8$, $A_{10}$, $A_{12}$, $A_{14}$ . . . : represent the high-order aspheric coefficients. In the tables 15 and 16, the surfaces 2 and 3 represent the object-side surface 811 and the image-side surface 812 of the first lens element 810, respectively, the surfaces 4 and 5 represent the object-side surface 821 and the image-side surface 822 of the second lens element 820, respectively, the surfaces 6 and 7 represent the object-side surface 831 and the image-side surface 832 of the third lens element 830, respectively, and the surfaces 8 and 9 represent the object-side surface 841 and the image-side surface 842 of the fourth lens element 840, respectively.

TABLE 15
(Embodiment 8)
f (focal length) = 2.32 mm, Fno = 2.5, HFOV= 44.9 deg.

| Surface # | | Curvature Radius | Thickness | Material | index | Abbe | Focal length |
|---|---|---|---|---|---|---|---|
| 0 | Object | Infinity | Infinity | | | | |
| 1 | Stop | Infinity | 0.00 | | | | |
| 2 (STOP) | Lens 1 | 1.48 (ASP) | 0.42 | Plastic | 1.544 | 56 | 2.55 |
| 3 | | −20.00 (ASP) | 0.21 | | | | |
| 4 | Lens 2 | −9.8 (ASP) | 0.25 | Plastic | 1.632 | 23 | −11.35 |
| 5 | | 27.08 (ASP) | 0.16 | | | | |
| 6 | Lens 3 | −1.11 (ASP) | 0.42 | Plastic | 1.544 | 56 | 9.76 |
| 7 | | −1.04 (ASP) | 0.20 | | | | |
| 8 | Lens 4 | 0.95 (ASP) | 0.53 | Plastic | 1.544 | 56 | −132.45 |
| 9 | | 0.75 (ASP) | 0.75 | | | | |
| 10 | IR-filter | Infinity | 0.21 | Glass | 1.517 | 64 | — |
| 11 | | Infinity | 0.05 | | | | |
| 12 | Image | Infinity | — | | | | |

TABLE 16
Aspheric Coefficients

| Surface # | 2 | 3 | 4 | 5 |
|---|---|---|---|---|
| k = | −12.5021 | 50 | 50 | −27.2641 |
| A4 = | 0.3360 | −0.4388 | −0.6263 | 0.2909 |
| A6 = | −0.8905 | −0.8088 | −0.7149 | −1.6388 |
| A8 = | −2.1165 | 1.3572 | −4.0134 | 2.2328 |
| A10 = | 16.3919 | −4.3477 | 26.6517 | 0.4410 |
| A12 = | −54.0629 | 11.5904 | −25.9038 | −0.7969 |
| A14 = | 56.9939 | −13.3273 | −6.5579 | −0.9487 |

| Surface # | 6 | 7 | 8 | 9 |
|---|---|---|---|---|
| k = | −11.7605 | −1.0308 | −2.3531 | −1.9626 |
| A4 = | 0.4788 | 0.1346 | −0.4062 | −0.3717 |
| A6 = | −0.2663 | −0.2036 | 0.1222 | 0.2532 |
| A8 = | −0.9284 | 0.5626 | 0.0150 | −0.1182 |

-continued

| | | | |
|---|---|---|---|
| A10 = | 0.4750 | 0.1472 | −0.0086 | 0.0325 |
| A12 = | 2.9267 | −0.7024 | −0.0007 | −0.0047 |
| A14 = | −3.2343 | 0.3070 | 0.0003 | 0.0003 |

Figure 9A:
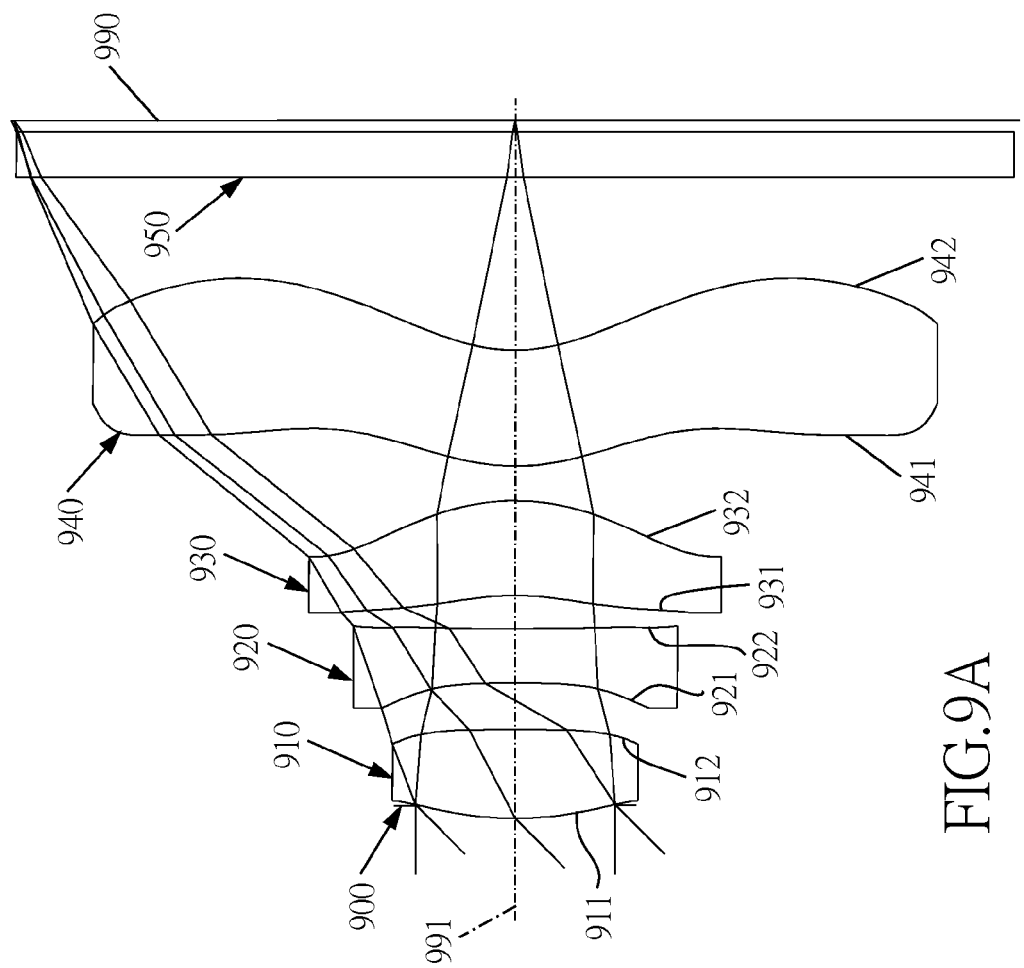
FIG. 9A shows an optical lens system cross-sectional view in accordance with the ninth embodiment.
Figure 9B:
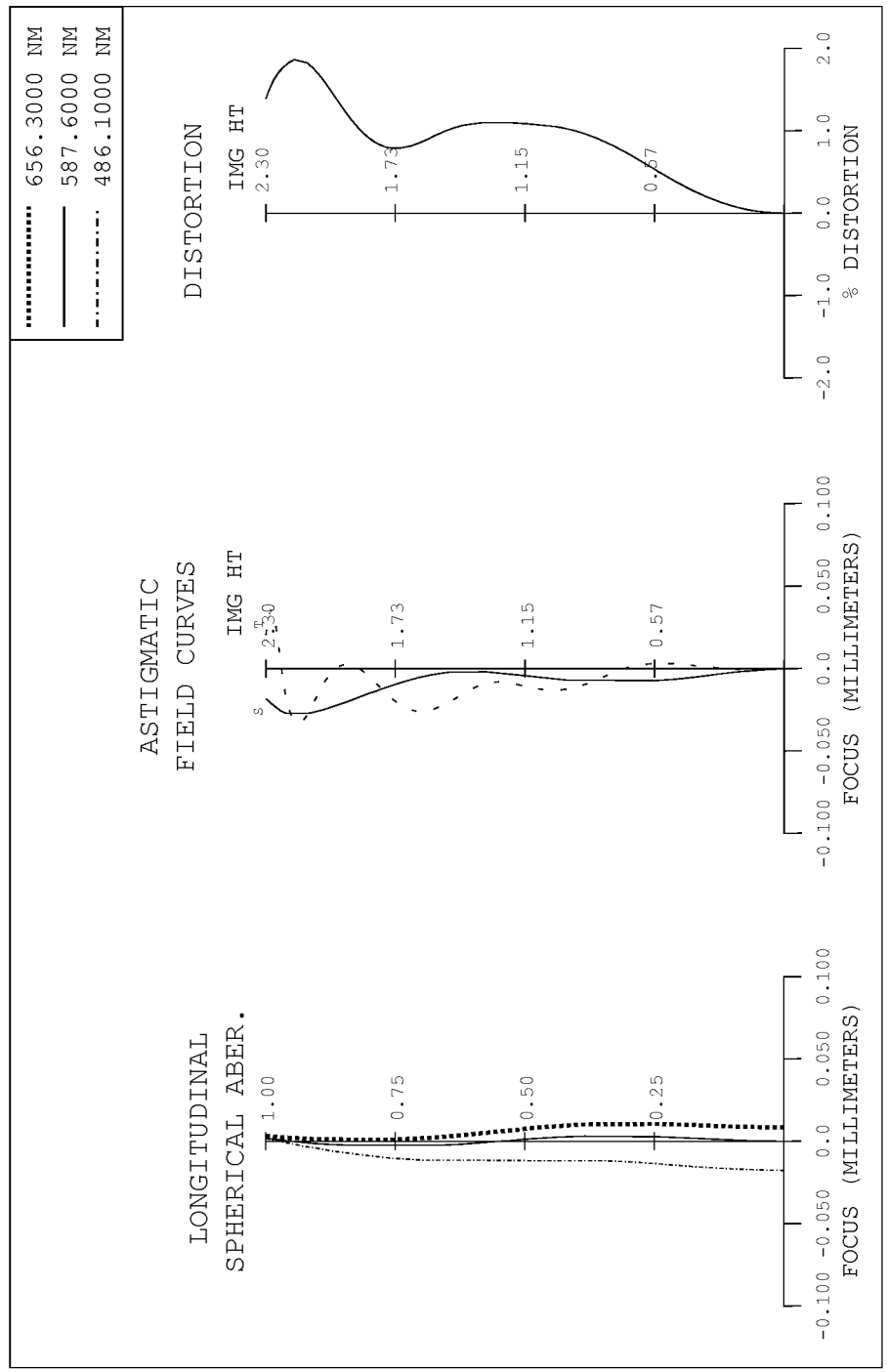
FIG. 9B shows spherical aberration curve, astigmatic field curves and distortion curve of the optical lens system in accordance with the ninth embodiment.

Referring to FIG. 9A, which shows an optical lens system cross-sectional view in accordance with a ninth embodiment of the present invention, and FIG. 9B shows the spherical aberration curves, the astigmatic field curves, and the distortion curve of the ninth embodiment of the present invention. An optical lens system in accordance with the ninth embodiment of the present invention comprises, in order from the object side to the image side:

A stop 900.

A first lens element 910 with a positive refractive power made of plastic has a convex object-side surface 911 and a convex image-side surface 912, and the object-side surface 911 and the image-side surface 912 of the first lens element 910 are aspheric.

A second lens element 920 with a negative refractive power made of plastic has a concave object-side surface 921 and a concave image-side surface 922, and the object-side surface 921 and the image-side surface 922 of the second lens element 920 are aspheric.

A third lens element 930 with a positive refractive power made of plastic has a concave object-side surface 931 and a convex image-side surface 932, and the object-side surface 931 and the image-side surface 932 of the third lens element 930 are aspheric.

A fourth lens element 940 with a positive refractive power made of plastic has a convex object-side surface 941 and a concave image-side surface 942, the object-side surface 941 and the image-side surface 942 of the fourth lens element 940 are aspheric, and at least one inflection point is formed on each of the object-side surface 941 and the image-side surface 942 of the fourth lens element 940.

An IR filter 950 made of glass is located between the image-side surface 942 of the fourth lens element 940 and an image plane 990 and has no influence on the focal length of the optical lens system.

The equation for the aspheric surface profiles of the ninth embodiment is expressed as follows:

$$z(h) = \frac{ch^2}{1 + \sqrt{1-(1+k)c^2h^2}} + A_4h^4 + A_6h^6 + A_8h^8 + A_{10}h^{10} + A_{12}h^{12} + A_{14}h^{14} + \ldots$$

z represents the distance of a point on the aspheric surface at a height h from the optical axis relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis;

k represents the conic constant;

$A_4, A_6, A_8, A_{10}, A_{12}, A_{14} \ldots$ : represent the high-order aspheric coefficients.

In the ninth embodiment of the present optical lens system, the focal length of the optical lens system is f, and it satisfies the condition:
f=2.28.

In the ninth embodiment of the present optical lens system, the f-number of the optical lens system is Fno, and it satisfies the condition:
Fno=2.5.

In the ninth embodiment of the present optical lens system, half of the maximum field of view of the present optical lens system is HFOV, it satisfies the relation: HFOV=44.9; and the maximum field of view of the present optical lens system is FOV, it satisfies the condition: FOV=89.8.

In the ninth embodiment of the present optical lens system, the focal length of the first lens element 910 is f1, the focal length of the optical lens system is f, and they satisfy the condition:
f1/f=1.11.

In the ninth embodiment of the present optical lens system, the maximum effective diameter of the image-side surface 932 of the third lens element 930 is CA_L3S2, the maximum effective diameter of the image-side surface 942 of the fourth lens element 940 is CA_L4S2, and they satisfy the condition: CA_L3S2/CA_L4S2=0.49.

In the ninth embodiment of the present optical lens system, a distance between the image-side surface 932 of the third lens element 930 and the object-side surface 941 of the fourth lens element 940 along the optical axis 991 is Dr7r8, a distance from the object-side surface 911 of the first lens element 910 to the image plane 990 along the optical axis 991 is TL, and they satisfy the condition: Dr7r8×100/TL=4.92.

In the ninth embodiment of the present optical lens system, a distance between the object-side surface 921 of the second lens element 920 and the object-side surface 931 of the third lens element 930 along the optical axis 991 is Dr4r6, a distance from the object-side surface 911 of the first lens element 910 to the image plane 990 along the optical axis 991 is TL, and they satisfy the condition: Dr4r6/TL=0.13.

In the ninth embodiment of the present optical lens system, a radius of curvature of the object-side surface 921 of the second lens element 920 is R4, a radius of curvature of the image-side surface 922 of the second lens element 920 is R5, and they satisfy the condition: (R4−R5)/(R4+R5)=−1.55.

In the ninth embodiment of the present optical lens system, the focal length of the third lens element 930 is f3, the focal length of the optical lens system is f, and they satisfy the condition: f3/f=3.29.

In the ninth embodiment of the present optical lens system, an Abbe number of the third lens element 930 is Vd3, an Abbe number of the second lens element 920 is Vd2, and they satisfy the condition: Vd3−Vd2=33.00.

In the ninth embodiment of the present optical lens system, a distance from the object-side surface 921 of the second lens element 920 to the image-side surface 932 of the third lens element 930 along the optical axis 991 is Dr4r7, the focal length of the optical lens system is f, and they satisfy the condition: Dr4r7/f=0.37.

In the ninth embodiment of the present optical lens system, the distance from the object-side surface 911 of the first lens element 910 to the image plane 990 along the optical axis 991 is TL, and a half of the maximum image height of the present optical lens system is ImgH, and they satisfy the condition: TL/ImgH=1.39.

The detailed optical data of the ninth embodiment is shown in table 17, and the aspheric surface data is shown in table 18, wherein the units of the radius of curvature, the thickness and the focal length in table 17 are expressed in mm, and in table 18, k represents the conic constant, and $A_4, A_6, A_8, A_{10}, A_{12}, A_{14}\ldots$ : represent the high-order aspheric coefficients. In the tables 17 and 18, the surfaces 2 and 3 represent the object-side surface 911 and the image-side surface 912 of the first lens element 910, respectively, the surfaces 4 and 5 represent the object-side surface 921 and the image-side surface 922 of the second lens element 920, respectively, the surfaces 6 and 7 represent the object-side surface 931 and the image-side surface 932 of the third lens element 930, respectively, and the surfaces 8 and 9 represent the object-side surface 941 and the image-side surface 942 of the fourth lens element 940, respectively.

different embodiments are obtained from experiments. Therefore, any product of the same structure is deemed to be within the scope of the present invention even if it uses different data. Table 19 lists the relevant data for the various embodiments of the present invention.

TABLE 17
(Embodiment 9)
f (focal length) = 2.28 mm, Fno = 2.5, HFOV= 44.9 deg.

| Surface # | | Curvature Radius | Thickness | Material | index | Abbe | Focal length |
|---|---|---|---|---|---|---|---|
| 0 | | Object | Infinity | Infinity | | | |
| 1 | | Stop | Infinity | 0.00 | | | |
| 2 | (STOP) | Lens 1 | 1.47 (ASP) | 0.41 | Plastic | 1.544 | 56 | 2.53 |
| 3 | | | −18.62 (ASP) | 0.21 | | | | |
| 4 | | Lens 2 | −6.14 (ASP) | 0.25 | Plastic | 1.632 | 23 | −7.97 |
| 5 | | | 28.51 (ASP) | 0.15 | | | | |
| 6 | | Lens 3 | −1.10 (ASP) | 0.43 | Plastic | 1.544 | 56 | 7.50 |
| 7 | | | −0.99 (ASP) | 0.16 | | | | |
| 8 | | Lens 4 | 0.92 (ASP) | 0.53 | Plastic | 1.544 | 56 | 100.00 |
| 9 | | | 0.75 (ASP) | 0.79 | | | | |
| 10 | | IR-filter | Infinity | 0.21 | Glass | 1.517 | 64 | — |
| 11 | | | Infinity | 0.05 | | | | |
| 12 | | Image | Infinity | — | | | | |

TABLE 18
Aspheric Coefficients

| Surface # | 2 | 3 | 4 | 5 |
|---|---|---|---|---|
| k = | −12.4765 | −150 | 35.38507 | 150.0000 |
| A4 = | 0.3488 | −0.4202 | −0.6175 | 0.3006 |
| A6 = | −0.9049 | −0.8163 | −0.7122 | −1.6340 |
| A8 = | −1.9941 | 1.2818 | −3.8839 | 2.1725 |
| A10 = | 15.9424 | −4.3731 | 26.8486 | 0.3217 |
| A12 = | −54.0629 | 11.5906 | −26.2274 | −0.8158 |
| A14 = | 56.9939 | −13.3273 | −6.5582 | −0.4543 |

| Surface # | 6 | 7 | 8 | 9 |
|---|---|---|---|---|
| k = | −12.6153 | −0.9810 | −2.7816 | −2.0940 |
| A4 = | 0.4972 | 0.1288 | −0.3364 | −0.3420 |
| A6 = | −0.3012 | −0.1749 | 0.1128 | 0.2424 |
| A8 = | −0.9200 | 0.5722 | 0.0108 | −0.1168 |
| A10 = | 0.4425 | 0.1454 | −0.0077 | 0.0332 |
| A12 = | 2.8539 | −0.7102 | −0.0007 | −0.0048 |
| A14 = | −3.0829 | 0.2891 | 0.0003 | 0.0003 |

It is to be noted that the tables 1-18 show different data from the different embodiments, however, the data of the

| | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| f | 2.18 | 2.20 | 2.27 | 2.35 | 2.29 | 2.24 | 2.32 | 2.32 | 2.28 |
| Fno | 2.50 | 2.50 | 2.50 | 2.50 | 2.50 | 2.50 | 2.50 | 2.50 | 2.50 |
| HFOV | 46.10 | 45.90 | 45.00 | 44.00 | 44.70 | 45.30 | 45.40 | 44.90 | 44.90 |
| f1/f | 1.14 | 1.18 | 1.19 | 1.38 | 1.13 | 1.24 | 1.18 | 1.10 | 1.11 |
| CA_L3S2/CA_L4S2 | 0.55 | 0.51 | 0.55 | 0.56 | 0.58 | 0.59 | 0.48 | 0.50 | 0.49 |
| Dr7r8x100/TL | 2.80 | 4.36 | 2.80 | 5.34 | 6.17 | 2.57 | 9.36 | 6.37 | 4.92 |
| Dr4r6/TL | 0.14 | 0.14 | 0.14 | 0.16 | 0.10 | 0.12 | 0.13 | 0.13 | 0.13 |
| (R4 − R5)/(R4 + R5) | 1.92 | 1.61 | 2.87 | 0.29 | −2.71 | 0.84 | 1.17 | −2.13 | −1.55 |
| f3/f | 0.53 | 0.61 | 0.68 | 0.56 | 0.48 | 0.39 | 1.44 | 4.21 | 3.29 |
| Vd3 − Vd2 | 34.00 | 34.00 | 34.00 | 34.00 | 34.00 | 34.00 | 33.00 | 33.00 | 33.00 |
| Dr4r7/f | 0.49 | 0.49 | 0.46 | 0.51 | 0.48 | 0.53 | 0.38 | 0.36 | 0.37 |
| TL/ImgH | 1.41 | 1.41 | 1.41 | 1.41 | 1.41 | 1.41 | 1.36 | 1.36 | 1.39 |
| FOV | 92.20 | 91.80 | 90.00 | 88.00 | 89.40 | 90.60 | 90.80 | 89.80 | 89.80 |

While we have shown and described various embodiments in accordance with the present invention, it is clear to those skilled in the art that further embodiments may be made without departing from the scope of the present invention.

What is claimed is:

1. An optical lens system, comprising, in order from an object side to an image side:
a stop;
a first lens element with a positive refractive power made of plastic having a convex object-side surface;
a second lens element with a negative refractive power made of plastic having an aspheric object-side surface and an aspheric image-side surface;
a third lens element with a positive refractive power made of plastic having a concave object-side surface and a convex image-side surface;
a fourth lens element with a refractive power made of plastic having an aspheric object-side surface and an aspheric concave image-side surface, and at least one inflection point being formed on at least one of the object-side surface and the image-side surface of the fourth lens element;
wherein a focal length of the first lens element is f1, a focal length of the optical lens system is f, a maximum effective diameter of the image-side surface of the third lens element is CA_L3S2, a maximum effective diameter of the image-side surface of the fourth lens element is CA_L4S2; and they satisfy the conditions:
$1 < f1/f < 1.6$;
$0.4 < CA\_L3S2/CA\_L4S2 < 0.7$.

2. The optical lens system as claimed in claim 1, wherein a distance between the object-side surface of the second lens element and the object-side surface of the third lens element along an optical axis is Dr4r6, a distance from the object-side surface of the first lens element to an image plane along the optical axis is TL, and they satisfy the condition:
$Dr4r6/TL < 0.2$.

3. The optical lens system as claimed in claim 1, wherein a radius of curvature of the object-side surface of the second lens element is R4, a radius of curvature of the image-side surface of the second lens element is R5, and they satisfy the condition:
$-4 < (R4-R5)/(R4+R5) < 4$.

4. The optical lens system as claimed in claim 1, wherein a focal length of the third lens element is f3, the focal length of the optical lens system is f, and they satisfy the condition:
$0.3 < f3/f < 5.5$.

5. The optical lens system as claimed in claim 4, wherein an Abbe number of the third lens element is Vd3, an Abbe number of the second lens element is Vd2, and they satisfy the condition:
$Vd3-Vd2 > 25$.

6. The optical lens system as claimed in claim 2, wherein a distance between the image-side surface of the third lens element and the object-side surface of the fourth lens element along an optical axis is Dr7r8, a distance from the object-side surface of the first lens element to an image plane along the optical axis is TL, and they satisfy the condition:
$2.0 < Dr7r8 \times 100/TL < 13$.

7. The optical lens system as claimed in claim 2, wherein a distance from the object-side surface of the second lens element to the image-side surface of the third lens element along an optical axis is Dr4r7, the focal length of the optical lens system is f, and they satisfy the condition:
$Dr4r7/f < 0.6$.

8. The optical lens system as claimed in claim 1, wherein a distance from the object-side surface of the first lens element to an image plane along an optical axis is TL, and a half of the maximum image height of the optical lens system is ImgH, and they satisfy the condition:
$TL/ImgH < 1.6$.

9. The optical lens system as claimed in claim 2, wherein $TL/ImgH < 1.55$.

10. The optical lens system as claimed in claim 1, wherein a maximum field of view of the optical lens system is FOV, it satisfies the condition:
FOV > 80 degrees.

11. An optical lens system, comprising, in order from an object side to an image side:
a stop;
a first lens element with a positive refractive power made of plastic having a convex object-side surface;
a second lens element with a negative refractive power made of plastic having an aspheric object-side surface and an aspheric concave image-side surface;
a third lens element with a positive refractive power made of plastic having a concave object-side surface and a convex image-side surface;
a fourth lens element with a negative refractive power made of plastic having an aspheric object-side surface and an aspheric concave image-side surface, and at least one inflection point being formed at least one of the object-side surface and the image-side surface of the fourth lens element;
wherein a focal length of the first lens element is f1, a focal length of the optical lens system is f, a distance between the image-side surface of the third lens element and the object-side surface of the fourth lens element along an optical axis is Dr7r8, a distance from the object-side surface of the first lens element to an image plane along the optical axis is TL, and they satisfy the conditions:
$1 < f1/f < 1.6$;
$2.0 < Dr7r8 \times 100/TL < 13$.

12. The optical lens system as claimed in claim 11, wherein a distance between the object-side surface of the second lens element and the object-side surface of the third lens element along an optical axis is Dr4r6, a distance from the object-side surface of the first lens element to an image plane along the optical axis is TL, and they satisfy the condition:
$Dr4r6/TL < 0.2$.

13. The optical lens system as claimed in claim 11, wherein a radius of curvature of the object-side surface of the second lens element is R4, a radius of curvature of the image-side surface of the second lens element is R5, and they satisfy the condition:
$-4 < (R4-R5)/(R4+R5) < 4$.

14. The optical lens system as claimed in claim 11, wherein a focal length of the third lens element is f3, the focal length of the optical lens system is f, and they satisfy the condition:
$0.3 < f3/f < 5.5$.

15. The optical lens system as claimed in claim 14, wherein an Abbe number of the third lens element is Vd3, an Abbe number of the second lens element is Vd2, and they satisfy the condition:
$Vd3-Vd2 > 25$.

16. The optical lens system as claimed in claim 11, wherein a maximum effective diameter of the image-side surface of the third lens element is CA_L3S2, a maximum effective diameter of the image-side surface of the fourth lens element is CA_L4S2; and they satisfy the condition:
$0.4 < CA\text{---}L3S2/CA\text{---}L4S2 < 0.7$.

17. The optical lens system as claimed in claim 12, wherein a distance from the object-side surface of the second lens element to the image-side surface of the third lens element along an optical axis is Dr4r7, the focal length of the optical lens system is f, and they satisfy the condition:

Dr4r7/f<0.6.

18. The optical lens system as claimed in claim 11, wherein a distance from the object-side surface of the first lens element to an image plane along an optical axis is TL, and a half of the maximum image height of the optical lens system is ImgH, and they satisfy the condition:

TL/ImgH<1.6.

19. The optical lens system as claimed in claim 12, wherein TL/ImgH<1.55.

20. The optical lens system as claimed in claim 11, wherein a maximum field of view of the optical lens system is FOV, it satisfies the condition:

FOV>80 degrees.

* * * * *